US012808061B2

(12) United States Patent
Borgstedt et al.

(10) Patent No.: US 12,808,061 B2
(45) Date of Patent: Nov. 24, 2026

(54) AZEOTROPE OR AZEOTROPE-LIKE COMPOSITIONS OF (Z)-1-CHLORO-2,3,3-TRIFLUOROPROP-1-ENE WITH ETHANOL OR METHANOL AND SOLVENT APPLICATIONS THEREOF

(71) Applicant: Solstice Advanced Materials US, Inc., Morris Plains, NJ (US)

(72) Inventors: Eric Borgstedt, Charlotte, NC (US); Justin Howard, Lakeview, NY (US); Joshua Close, Cheektowaga, NY (US); Robert J. Stewart, Buffalo, NY (US)

(73) Assignee: Solstice Advanced Materials US, Inc., Morris Plains, NJ (US)

( * ) Notice: Subject to any disclaimer, the term of this patent is extended or adjusted under 35 U.S.C. 154(b) by 237 days.

(21) Appl. No.: 18/543,076

(22) Filed: Dec. 18, 2023

(65) Prior Publication Data

US 2024/0209516 A1 Jun. 27, 2024

Related U.S. Application Data

(60) Provisional application No. 63/433,966, filed on Dec. 20, 2022.

(51) Int. Cl.

| | |
|---|---|
| ***C11D 7/00*** | (2006.01) |
| ***C11D 7/50*** | (2006.01) |
| ***C23G 5/028*** | (2006.01) |

(52) U.S. Cl.

CPC .......... *C23G 5/02841* (2013.01); *C11D 7/509* (2013.01); *C23G 5/02867* (2013.01)

(58) Field of Classification Search

CPC ............ C23G 5/02841; C23G 5/02867; C23G 5/02806; C11D 7/509

(Continued)

(56) References Cited

U.S. PATENT DOCUMENTS

2010/0102272 A1* 4/2010 Basu ...................... A61Q 19/00 252/182.12
2010/0102273 A1* 4/2010 Basu ...................... C09K 3/30 252/182.15

(Continued)

FOREIGN PATENT DOCUMENTS

CN 114846129 A 8/2022
JP 2020-037726 A 3/2020

(Continued)

OTHER PUBLICATIONS

International Preliminary Report on Patentability received for PCT Patent Application No. PCT/US2023/084742, mailed on Jul. 3, 2025, 7 pages.

(Continued)

*Primary Examiner* — Eisa B Elhilo

(74) *Attorney, Agent, or Firm* — Faegre Drinker Biddle & Reath LLP

(57) ABSTRACT

Azeotrope or azeotrope-like compositions and, in particular, azeotrope or azeotrope-like compositions consisting essentially of, or consisting of, (Z)-1-chloro-2,3,3-trifluoroprop-1-ene (HCFO-1233yd(Z)) with each of ethanol and methanol, as well as azeotrope or azeotrope-like compositions consisting essentially of, or consisting of, (Z)-1-chloro-2,3,3-trifluoroprop-1-ene (HCFO-1233yd(Z)), ethanol and trans-dichloroethylene (trans-DCE), and azeotrope or azeotrope-like compositions consisting essentially of, or consisting of, (Z)-1-chloro-2,3,3-trifluoroprop-1-ene (HCFO-1233yd(Z)), methanol and trans-dichloroethylene (trans-DCE), and solvent applications of the foregoing compositions.

17 Claims, 8 Drawing Sheets

(58) Field of Classification Search
USPC .......................................................... 510/408
See application file for complete search history.

(56) References Cited

U.S. PATENT DOCUMENTS

| | | | | |
|---|---|---|---|---|
| 2012/0122996 | A1* | 5/2012 | Basu | C08J 9/149 252/364 |
| 2013/0004435 | A1* | 1/2013 | Cook | C23G 5/02825 521/88 |
| 2014/0206589 | A1* | 7/2014 | Cook | C11D 7/5081 510/177 |
| 2015/0231527 | A1 | 8/2015 | Singh | |
| 2016/0310922 | A1 | 10/2016 | Singh et al. | |
| 2021/0276934 | A1* | 9/2021 | Mitsuoka | C09D 7/20 |
| 2022/0089982 | A1* | 3/2022 | Wu | C11D 7/5086 |
| 2023/0407210 | A1 | 12/2023 | Kikuchi | |

FOREIGN PATENT DOCUMENTS

| | | | | |
|---|---|---|---|---|
| JP | 2021-155711 | A | 10/2021 | |
| JP | 2022-086487 | A | 6/2022 | |
| WO | 2017/122802 | A1 | 7/2017 | |
| WO | WO 2020142650 | A1 * | 7/2020 | C11D 7/509 |
| WO | 2021/131810 | A1 | 7/2021 | |

OTHER PUBLICATIONS

International Search Report and Written Opinion received for PCT Patent Application No. PCT/US23/084742, mailed on Apr. 29, 2024, 9 pages.

* cited by examiner

AZEOTROPE OR AZEOTROPE-LIKE COMPOSITIONS OF (Z)-1-CHLORO-2,3,3-TRIFLUOROPROP-1-ENE WITH ETHANOL OR METHANOL AND SOLVENT APPLICATIONS THEREOF

CROSS-REFERENCE TO RELATED APPLICATION

This application claims the benefit of U.S. Provisional Application No. 63/433,966, filed Dec. 20, 2022, which is herein incorporated by reference in its entirety.

FIELD

The present disclosure is related to azeotrope or azeotrope-like compositions and, in particular, to azeotrope or azeotrope-like compositions consisting essentially of, or consisting of, (Z)-1-chloro-2,3,3-trifluoroprop-1-ene (HCFO-1233yd(Z)) with each of ethanol and methanol, as well as azeotrope or azeotrope-like compositions consisting essentially of, or consisting of, (Z)-1-chloro-2,3,3-trifluoroprop-1-ene (HCFO-1233yd(Z)), ethanol and 1,2-trans-dichloroethylene (trans-DCE) and azeotrope or azeotrope-like compositions consisting essentially of, or consisting of, (Z)-1-chloro-2,3,3-trifluoroprop-1-ene (HCFO-1233yd(Z)), methanol and 1,2-trans-dichloroethylene (trans-DCE), and solvent applications of the foregoing compositions.

BACKGROUND

Fluorocarbon fluids have properties that are desirable for use as heat transfer media, immersion coolants, liquid or gaseous dielectrics, industrial refrigerants, and other applications. For these applications, the use of single component fluids or azeotrope-like mixtures, i.e., those which do not substantially fractionate on boiling and evaporation, are particularly desirable. Unfortunately, the use of certain hydrofluorocarbons “HFCs” in industrial applications is now believed to contribute to global warming, and accordingly, their contemporary use has been curtailed. The identification of new, environmentally safe, non-fractionating mixtures comprising HFCs is complicated, due to the fact that azeotrope formation is not readily predictable. Therefore, the industry is continually seeking new HFC-based mixtures that are acceptable and environmentally safer substitutes.

SUMMARY

It has been found that certain azeotrope and azeotrope-like compositions may arise from (Z)-1-chloro-2,3,3-trifluoroprop-1-ene (HCFO-1233yd(Z)) combined with additional components and, in particular, the present disclosure provides minimum-boiling, binary homogeneous azeotrope or azeotrope-like compositions consisting essentially of, or consisting of, (Z)-1-chloro-2,3,3-trifluoroprop-1-ene (HCFO-1233yd(Z)) with each of ethanol and methanol, as well as ternary homogeneous azeotrope or azeotrope-like compositions consisting essentially of, or consisting of, (Z)-1-chloro-2,3,3-trifluoroprop-1-ene (HCFO-1233yd(Z)), ethanol and trans-dichloroethylene (trans-DCE) or consisting essentially of, or consisting of, (Z)-1-chloro-2,3,3-trifluoroprop-1-ene (HCFO-1233yd(Z)), methanol and trans-dichloroethylene (trans-DCE).

The azeotrope and azeotrope-like mixtures of the disclosure exhibit characteristics which make them particularly suitable for a number of applications, including solvents for cleaning, vapor degreasing, or aerosol sprays.

In one form thereof the present disclosure provides a composition comprising an azeotrope or azeotrope-like composition consisting essentially of effective amounts of (Z)-1-chloro-2,3,3-trifluoroprop-1-ene and methanol.

In another form thereof, the present disclosure provides a composition comprising an azeotrope or azeotrope-like composition consisting essentially of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices: point A: ((Z)-1-chloro-2,3,3-trifluoroprop-1-ene/methanol/trans-dichloroethylene=about 0.9 wt. %/about 8.2 wt. %/about 90.9 wt. %); point B: ((Z)-1-chloro-2,3,3-trifluoroprop-1-ene/methanol/trans-dichloroethylene=about 0.9 wt. %/about 13.7 wt. %/about 85.4 wt. %); point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

In further form thereof, the present disclosure provides a composition comprising an azeotrope or azeotrope-like composition consisting essentially of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices: point M: ((Z)-1-chloro-2,3,3-trifluoroprop-1-ene/ethanol/trans-dichloroethylene=about 1.0 wt. %/about 1.0 wt. %/about 98.0 wt. %); point N: ((Z)-1-chloro-2,3,3-trifluoroprop-1-ene/ethanol/trans-dichloroethylene=about 0.9 wt. %/about 9.0 wt. %/about 90.1 wt. %); point 0: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.5 wt. %/about 0.6 wt. %/about 64.1 wt. %).

In a still further form thereof, the present disclosure provides a solvent composition comprising at least one of: an azeotrope or azeotrope-like composition consisting essentially of effective amounts of (Z)-1-chloro-2,3,3-trifluoroprop-1-ene and methanol; an azeotrope or azeotrope-like composition consisting essentially of (Z)-1-chloro-2,3,3-trifluoroprop-1-ene, methanol, and trans-dichloroethylene; and an azeotrope or azeotrope-like composition consisting essentially of (Z)-1-chloro-2,3,3-trifluoroprop-1-ene, methanol, and trans-dichloroethylene.

Solvent compositions comprising a binary azeotrope of (Z)-1-chloro-2,3,3-trifluoroprop-1-ene (HCFO-1233yd(Z)) and ethanol will sometimes be referred to herein as Solvent Composition 1. Solvent composition 1 can consist essentially of a binary azeotrope of (Z)-1-chloro-2,3,3-trifluoroprop-1-ene (HCFO-1233yd(Z)) and ethanol. Solvent composition 1 can consist of a binary azeotrope of (Z)-1-chloro-2,3,3-trifluoroprop-1-ene (HCFO-1233yd(Z)) and ethanol.

Solvent compositions comprising a binary azeotrope of (Z)-1-chloro-2,3,3-trifluoroprop-1-ene (HCFO-1233yd(Z)) and methanol will sometimes be referred to herein as Solvent Composition 2. Solvent Composition 2 can consist essentially of a binary azeotrope of (Z)-1-chloro-2,3,3-trifluoroprop-1-ene (HCFO-1233yd(Z)) and methanol. Solvent Composition 2 can consist of a binary azeotrope of (Z)-1-chloro-2,3,3-trifluoroprop-1-ene (HCFO-1233yd(Z)) and methanol.

Solvent compositions comprising a ternary azeotrope of (Z)-1-chloro-2,3,3-trifluoroprop-1-ene (HCFO-1233yd(Z)), ethanol, and trans-dichloroethylene (trans-DCE) will sometimes be referred to herein as Solvent Composition 3. Solvent Composition 3 can consist essentially of a ternary azeotrope of (Z)-1-chloro-2,3,3-trifluoroprop-1-ene (HCFO-1233yd(Z)), ethanol, and trans-dichloroethylene (trans-DCE). Solvent Composition 3 can consist of ternary azeotrope of (Z)-1-chloro-2,3,3-trifluoroprop-1-ene (HCFO-1233yd(Z)), ethanol, and trans-dichloroethylene (trans-DCE).

Solvent compositions comprising, a ternary azeotrope of (Z)-1-chloro-2,3,3-trifluoroprop-1-ene (HCFO-1233yd(Z)), methanol, and trans-dichloroethylene (trans-DCE) will sometimes be referred to herein as Solvent Composition 4. Solvent Composition 4 can consist essentially of a ternary azeotrope of (Z)-1-chloro-2,3,3-trifluoroprop-1-ene (HCFO-1233yd(Z)), methanol, and trans-dichloroethylene (trans-DCE). Solvent Composition 4 can consist of a ternary azeotrope of (Z)-1-chloro-2,3,3-trifluoroprop-1-ene (HCFO-1233yd(Z)), methanol, and trans-dichloroethylene (trans-DCE).

DETAILED DESCRIPTION

Figure 1:
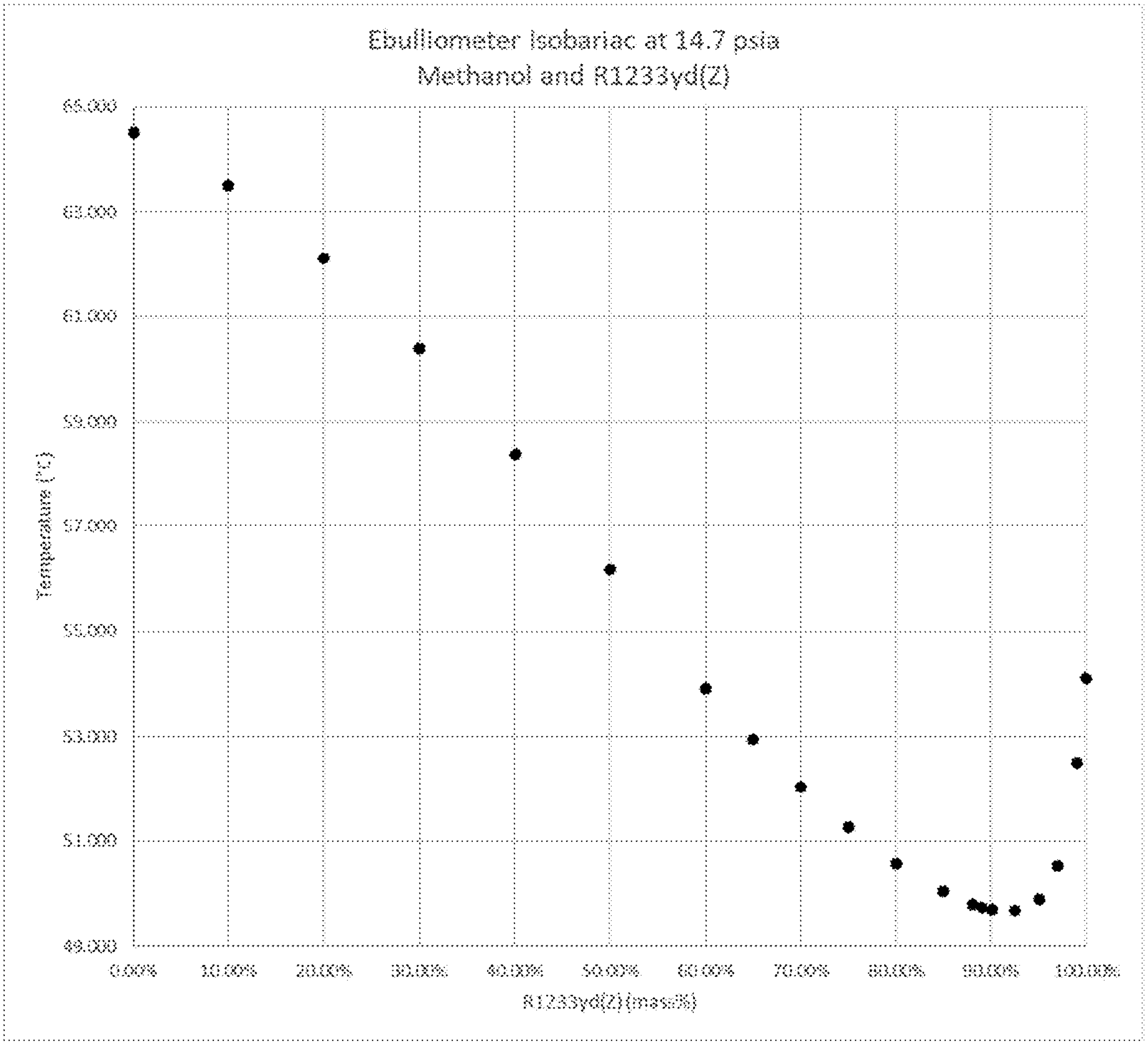
FIG. 1 illustrates the change in boiling point temperature of mixtures of (Z)-1-chloro-2,3,3-trifluoroprop-1-ene (HCFO-1233yd(Z)) and methanol at ambient pressure according to Example 1.

I. Definitions and Description of Azeotrope or Azeotrope-Like Compositions

An "azeotrope" composition is a unique combination of two, three, or more components. An azeotrope composition can be characterized in various ways. For example, at a given pressure, an azeotrope composition boils at a constant characteristic temperature which is either greater than the higher boiling point component (maximum boiling azeotrope) or less than the lower boiling point component (minimum boiling azeotrope). At this characteristic temperature the same composition will exist in both the vapor and liquid phases. The azeotrope composition does not fractionate upon boiling or evaporation. Therefore, the components of the azeotrope composition cannot be separated during a phase change.

An azeotrope composition is also characterized by a characteristic azeotrope temperature, where the bubble point pressure of the liquid phase is identical to the dew point pressure of the vapor phase.

The behavior of an azeotrope composition is in contrast with that of a non-azeotrope composition, in which during boiling or evaporation the liquid composition changes to a substantial degree.

For the purposes of the present disclosure, an azeotrope composition is characterized as that composition which boils at a constant characteristic temperature, the temperature being lower (a minimum boiling azeotrope) than the boiling points of the two or more components, and thereby having the same composition in both the vapor and liquid phases.

One of ordinary skill in the art would understand that at different pressures, both the composition and the boiling point of the azeotrope composition will vary to some extent. Therefore, depending on the temperature and/or pressure, an azeotrope composition can have a variable composition. The skilled person would therefore understand that composition ranges, rather than fixed compositions, can be used to define azeotrope compositions. In addition, an azeotrope may be defined in terms of exact weight percentages of each component of the compositions characterized by a fixed boiling point at a specified pressure.

An "azeotrope-like" composition is a composition of two, three, or more components which behaves substantially as an azeotrope composition. Thus, for the purposes of this disclosure, an azeotrope-like composition is a combination of two, three or more different components which, when in liquid form under given pressure, will boil at a substantially constant temperature, and which will provide a vapor composition substantially identical to the liquid composition undergoing boiling.

Azeotrope or azeotrope-like compositions can be identified by several different methods.

For the purposes of this disclosure the azeotrope or azeotrope-like composition is identified experimentally using an ebulliometer (Walas, Phase Equilibria in Chemical Engineering, Butterworth-Heinemann, 1985, 533-544). An ebulliometer is designed to provide extremely accurate measurements of the boiling points of liquids by measuring the temperature of the vapor-liquid equilibrium.

The boiling points of each of the components alone are measured at a constant pressure. As the skilled person will appreciate, for a binary azeotrope or azeotrope-like composition, the boiling point of one of the components of the composition is initially measured. The second component of the composition is then added in varying amounts and the boiling point of each of the obtained compositions is measured using the ebulliometer at said constant pressure.

The measured boiling points are plotted against the composition of the tested composition, for example, for a binary azeotrope, the amount of the second component added to the composition, (expressed as either mass or weight %, wt. %, or mole %). The presence of an azeotrope composition can be identified by the observation of a maximum or minimum boiling temperature which is greater or less than the boiling points of any of the components alone.

As the skilled person will appreciate, the identification of the azeotrope or azeotrope-like composition is made by the comparison of the change in the boiling point of the composition on addition of the second component to the first component, relative to the boiling point of the first component. Thus, it is not necessary that the system be calibrated to the reported boiling point of the particular components in order to measure the change in boiling point.

As used herein, the term "(Z)-1-chloro-2,3,3-trifluoroprop-1-ene" refers to HCFO-1233yd(Z) which may be abbreviated as HCFO-1233yd(Z) or R-1233yd(Z).

As used herein, the term "trans-dichloroethylene" refers to trans-1,2-dichloroethene which may be abbreviated as trans-DCE.

As used herein, the term "consisting essentially of", with respect to the components of an azeotrope or azeotrope-like composition or mixture, means the composition contains the indicated components in an azeotrope or azeotrope-like ratio, and may contain additional components provided that the additional components do not form new azeotrope or azeotrope-like systems. For example, azeotrope mixtures consisting essentially of two compounds are those that form binary azeotropes, which optionally may include one or more additional components, provided that the additional components do not render the mixture non-azeotrope and do not form an azeotrope with either or both of the compounds (e.g., do not form a ternary or higher azeotrope). Likewise, azeotrope mixtures consisting essentially of three compounds are those that form ternary azeotropes, which optionally may include one or more additional components, provided that the additional components do not render the mixture non-azeotrope and do not form an azeotrope with either or both of the compounds (e.g., do not form a quaternary or higher azeotrope).

As used herein, the singular forms "a", "an" and "the" include plural unless the context clearly dictates otherwise. Moreover, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the term "effective amount" is an amount of each component which, when combined with the other component, results in the formation of an azeotrope or azeotrope-like mixture.

As previously discussed, at the maximum or minimum boiling point, the composition of the vapor phase will be identical to the composition of the liquid phase. The azeotrope-like composition is therefore that composition of components which provides a substantially constant minimum or maximum boiling point at which substantially constant boiling point the composition of the vapor phase will be substantially identical to the composition of the liquid phase.

II. Azeotrope or Azeotrope-Like Compositions of (Z)-1-Chloro-2,3,3-Trifluoroprop-1-Ene and Methanol It has been found that (Z)-1-chloro-2,3,3-trifluoroprop-1-ene (HCFO-1233yd(Z)) forms homogeneous, minimum boiling azeotrope and azeotrope-like compositions or mixtures with methanol, and the present disclosure provides homogeneous azeotrope or azeotrope-like compositions comprising (Z)-1-chloro-2,3,3-trifluoroprop-1-ene and methanol. The azeotrope or azeotrope-like compositions preferably consist essentially of (Z)-1-chloro-2,3,3-trifluoroprop-1-ene and methanol. The azeotrope or azeotrope-like compositions may consist of (Z)-1-chloro-2,3,3-trifluoroprop-1-ene and methanol.

The present inventors have found experimentally that (Z)-1-chloro-2,3,3-trifluoroprop-1-ene and methanol form an azeotrope or azeotrope-like composition.

The present disclosure provides an azeotrope or azeotrope-like composition which consists essentially of effective amounts of (Z)-1-chloro-2,3,3-trifluoroprop-1-ene and methanol to form an azeotrope or azeotrope-like composition.

The present disclosure also provides a method of forming an azeotrope or azeotrope-like composition by combining effective amounts of, (Z)-1-chloro-2,3,3-trifluoroprop-1-ene and methanol. Any of a wide variety of methods known in the art for combining two or more components to form a composition can be used in the present methods. For example, (Z)-1-chloro-2,3,3-trifluoroprop-1-ene and methanol can be mixed, blended, or otherwise combined by hand and/or by machine, as part of a batch or continuous reaction and/or process, or via combinations of two or more such steps. Both (Z)-1-chloro-2,3,3-trifluoroprop-1-ene and methanol are commercially available and can be procured from several different vendors. The components can be provided in the required amounts, for example by weighing and then combining the amounts.

Preferably, the azeotrope or azeotrope-like composition may comprise from about 88 wt. % to 98 wt. % (Z)-1-chloro-2,3,3-trifluoroprop-1-ene, preferably from about 89.5 wt. % to 93.7 wt. % (Z)-1-chloro-2,3,3-trifluoroprop-1-ene, or preferably from about 90.01 wt. % to 92.52 wt. % (Z)-1-chloro-2,3,3-trifluoroprop-1-ene and from about 12 wt. % to 2 wt. % methanol, preferably from about 10.5 wt. % to 6.3 wt. % methanol, or preferably from about 9.99 wt. % to 7.48 wt. % methanol. The azeotrope or azeotrope-like composition may also comprise about 91.1 wt. % (Z)-1-chloro-2,3,3-trifluoroprop-1-ene and 8.9 wt. % methanol. Preferably, the azeotrope or azeotrope-like composition of the present disclosure has a boiling point of about 49.680° C.±0.001° C. at a pressure of about 14.7 psia±0.2 psia.

In other words, the azeotrope or azeotrope-like composition comprises, consists essentially of, or consists of, from about 88 wt. % to 98 wt. % of R1233yd(Z) and 12 wt. % to 2 wt. % methanol, from about 89.5 wt. % to 93.7 wt. % R1233yd(Z) and 10.5 wt. % to 6.3 wt. % methanol, from about 90.01 wt. % to 92.52 wt. % R1233yd(Z) and 9.99 wt. % to 7.48 wt. % methanol, or about 91.1 wt. % R1233yd(Z) and 8.9 wt. % methanol.

The azeotrope-like composition may comprise from about 88 wt. % to 94 wt. % (Z)-1-chloro-2,3,3-trifluoroprop-1-ene, preferably from about 90.0 wt. % to 92.2 wt. % (Z)-1-chloro-2,3,3-trifluoroprop-1-ene, or preferably from about 90.6 wt. % to 91.7 wt. % (Z)-1-chloro-2,3,3-trifluoroprop-1-ene and from about 12 wt. % to 6 wt. % methanol, preferably from about 10.0 wt. % to 7.8 wt. % methanol, or preferably from about 9.4 wt. % to 8.3 wt. % methanol.

The true azeotrope is about 91.1 wt. % (Z)-1-chloro-2,3,3-trifluoroprop-1-ene and 8.9 wt. % methanol and has a boiling point of about 49.66° C.±0.01° C. at a pressure of about 14.7 psia±0.2 psia.

In other words, the azeotrope or azeotrope-like composition consists essentially of, or consists of, from about 88 wt. % to 94 wt. % of HCFO-1233yd(Z) and 12 wt. % to 6 wt. % methanol, from about 90.0 wt. % to 92.2 wt. % HCFO-1233yd(Z) and 10.0 wt. % to 7.8 wt. % methanol, from about 90.6 wt. % to 91.7 wt. % HCFO-1233yd(Z) and 9.4 wt. % to 8.3 wt. % methanol, or about 91.1 wt. % HCFO-1233yd(Z) and 8.9 wt. % methanol.

The azeotrope or azeotrope-like composition may preferably consist essentially of (Z)-1-chloro-2,3,3-trifluoroprop-1-ene and methanol in the above amounts or consist of (Z)-1-chloro-2,3,3-trifluoroprop-1-ene and methanol in the above amounts.

The present disclosure also provides a composition, preferably a solvent composition comprising the azeotrope or azeotrope-like composition. For example, there is provided a composition, preferably a solvent composition comprising at least about 5 wt. % of the azeotrope or azeotrope-like composition, or at least about 15 wt. % of the azeotrope or azeotrope-like composition, or at least about 50 wt. % of the azeotrope or azeotrope-like composition, or at least about 70 wt. % of the azeotrope or azeotrope-like composition, or at least about 90 wt. % of the azeotrope or azeotrope-like composition.

III. Azeotrope or Azeotrope-Like Compositions of (Z)-1-Chloro-2,3,3-Trifluoroprop-1-Ene and Ethanol It has been found that (Z)-1-chloro-2,3,3-trifluoroprop-1-ene (HCFO-1233yd(Z)) also forms homogeneous, minimum boiling azeotrope and azeotrope-like compositions or mixtures with ethanol, and the present disclosure provides homogeneous azeotrope or azeotrope-like compositions consisting essentially of (Z)-1-chloro-2,3,3-trifluoroprop-1-ene and ethanol. The azeotrope or azeotrope-like compositions may preferably consist essentially of (Z)-1-chloro-2,3,3-trifluoroprop-1-ene and ethanol, consist essentially of (Z)-1-chloro-2,3,3-trifluoroprop-1-ene and ethanol, or the azeotrope or azeotrope-like compositions may consist of (Z)-1-chloro-2,3,3-trifluoroprop-1-ene and ethanol.

The present inventors have found experimentally that (Z)-1-chloro-2,3,3-trifluoroprop-1-ene and ethanol form an azeotrope or azeotrope-like composition.

The azeotrope or azeotrope-like composition of (Z)-1-chloro-2,3,3-trifluoroprop-1-ene and ethanol is a binary azeotrope which includes only the foregoing two components and lacks other components.

The present disclosure provides an azeotrope or azeotrope-like composition which consists essentially of effective amounts of (Z)-1-chloro-2,3,3-trifluoroprop-1-ene and ethanol to form an azeotrope or azeotrope-like composition.

The present disclosure also provides a method of forming an azeotrope or azeotrope-like composition by mixing, combining, or blending, effective amounts of, (Z)-1-chloro-2,3,3-trifluoroprop-1-ene and ethanol. Any of a wide variety of methods known in the art for combining two or more components to form a composition can be used in the present methods. For example, (Z)-1-chloro-2,3,3-trifluoroprop-1-ene and ethanol can be mixed, blended, or otherwise combined by hand and/or by machine, as part of a batch or continuous reaction and/or process, or via combinations of two or more such steps. Both (Z)-1-chloro-2,3,3-trifluoroprop-1-ene and ethanol are commercially available and can be procured from several different vendors. The components can be provided in the required amounts, for example by weighing and then combining the amounts.

Preferably, the azeotrope or azeotrope-like composition may comprise from about 89.5 wt. % to 99.9 wt. % (Z)-1-chloro-2,3,3-trifluoroprop-1-ene, preferably from about 90 wt. % to 98.0 wt. % (Z)-1-chloro-2,3,3-trifluoroprop-1-ene, or preferably from about 95.04 wt. % to 96.02 wt. % (Z)-1-chloro-2,3,3-trifluoroprop-1-ene and from about 0.1 wt. % to 10.5 wt. % ethanol, preferably from about 2 wt. % to 10 wt. % ethanol, or preferably from about 3.98 wt. % to 4.96 wt. % ethanol. The azeotrope or azeotrope-like composition may also comprise about 95.9 wt. % (Z)-1-chloro-2,3,3-trifluoroprop-1-ene and 4.1 wt. % ethanol. Preferably, the azeotrope or azeotrope-like composition of the present disclosure has a boiling point of about 53.506° C.±0.001° C. at a pressure of about 14.7 psia±0.2 psia.

In other words, the azeotrope or azeotrope-like composition comprises, consists essentially of, or consists of, from about 89.5 wt. % to 99.9 wt. % of R1233yd(Z) and 0.1 wt. % to 10.5 wt. % ethanol, from about 90 wt. % to 98.0 wt. % R1233yd(Z) and 2 wt. % to 10 wt. % ethanol, from about 95.04 wt. % to 96.02 wt. % R1233yd(Z) and 3.98 wt. % to 3.46 wt. % ethanol, or about 95.9 wt. % R1233yd(Z) and 4.1 wt. % ethanol.

The azeotrope-like composition may comprise from about 92.5 wt. % to 99.9 wt. % (Z)-1-chloro-2,3,3-trifluoroprop-1-ene, preferably from about 94.8 wt. % to 97.5 wt. % (Z)-1-chloro-2,3,3-trifluoroprop-1-ene, or preferably from about 95.3 wt. % to 96.4 wt. % (Z)-1-chloro-2,3,3-trifluoroprop-1-ene and from about 7.5 wt. % to 0.1 wt. % ethanol, preferably from about 5.2 wt. % to 2.5 wt. % ethanol, or preferably from about 4.7 wt. % to 3.6 wt. % ethanol.

The true azeotrope is about 95.9 wt. % (Z)-1-chloro-2,3,3-trifluoroprop-1-ene and 4.1 wt. % ethanol and has a boiling point of about 53.50° C.±0.01° C. at a pressure of about 14.7 psia±0.2 psia.

In other words, the azeotrope or azeotrope-like composition consists essentially of, or consists of, from about 92.5 wt. % to 99.9 wt. % of HCFO-1233yd(Z) and 7.5 wt. % to 0.1 wt. % ethanol, from about 94.8 wt. % to 97.5 wt. % HCFO-1233yd(Z) and 5.2 wt. % to 2.5 wt. % ethanol, from about 95.3 wt. % to 96.4 wt. % HCFO-1233yd(Z) and 4.7 wt. % to 3.6 wt. % ethanol, or about 95.9 wt. % HCFO-1233yd(Z) and 4.1 wt. % ethanol.

The azeotrope or azeotrope-like composition may consist essentially of (Z)-1-chloro-2,3,3-trifluoroprop-1-ene and ethanol in the above amounts or consist of (Z)-1-chloro-2,3,3-trifluoroprop-1-ene and ethanol in the above amounts.

The present disclosure also provides a composition comprising the azeotrope or azeotrope-like composition. For example, there is provided a composition comprising at least about 5 wt. % of the azeotrope or azeotrope-like composition, or at least about 15 wt. % of the azeotrope or azeotrope-like composition, or at least about 50 wt. % of the azeotrope or azeotrope-like composition, or at least about 70 wt. % of the azeotrope or azeotrope-like composition, or at least about 90 wt. % of the azeotrope or azeotrope-like composition.

IV. Ternary Azeotrope or Azeotrope-Like Compositions of (Z)-1-Chloro-2,3,3-Trifluoroprop-1-Ene, Methanol, and Trans-Dichloroethylene It has been found that (Z)-1-chloro-2,3,3-trifluoroprop-1-ene (HCFO-1233yd(Z)) forms homogeneous, minimum boiling azeotrope and azeotrope-like compositions or mixtures with methanol and trans-dichloroethylene (trans-DCE) and the present disclosure provides homogeneous azeotrope or azeotrope-like compositions preferably consisting essentially of (Z)-1-chloro-2,3,3-trifluoroprop-1-ene, methanol, and trans-dichloroethylene. The azeotrope or azeotrope-like compositions may consist of (Z)-1-chloro-2,3,3-trifluoroprop-1-ene, methanol, and trans-dichloroethylene.

It has been shown experimentally that (Z)-1-chloro-2,3,3-trifluoroprop-1-ene, methanol, and trans-dichloroethylene form an azeotrope or azeotrope-like composition.

The azeotrope or azeotrope-like composition of (Z)-1-chloro-2,3,3-trifluoroprop-1-ene, methanol, and trans-dichloroethylene may be a ternary azeotrope which includes only the foregoing three components and lacks other components.

The present azeotrope or azeotrope-like compositions may preferably consist essentially of combinations of (Z)-1-chloro-2,3,3-trifluoroprop-1-ene, methanol, and trans-dichloroethylene. The present azeotrope or azeotrope-like compositions may consist of combinations of (Z)-1-chloro-2,3,3-trifluoroprop-1-ene, methanol, and trans-dichloroethylene.

The present disclosure also provides a method of forming an azeotrope or azeotrope-like composition by combining effective amounts of, (Z)-1-chloro-2,3,3-trifluoroprop-1-ene, methanol, and trans-dichloroethylene. Any of a wide variety of methods known in the art for combining two or more components to form a composition can be used in the present methods. For example, (Z)-1-chloro-2,3,3-trifluoroprop-1-ene, methanol, and trans-dichloroethylene can be mixed, blended, or otherwise combined by hand and/or by machine, as part of a batch or continuous reaction and/or process, or via combinations of two or more such steps. Each of (Z)-1-chloro-2,3,3-trifluoroprop-1-ene, methanol, and trans-dichloroethylene are commercially available and can be procured from several different vendors. The components can be provided in the required amounts, for example by weighing and then combining the amounts.

Figures 7A, 7B:
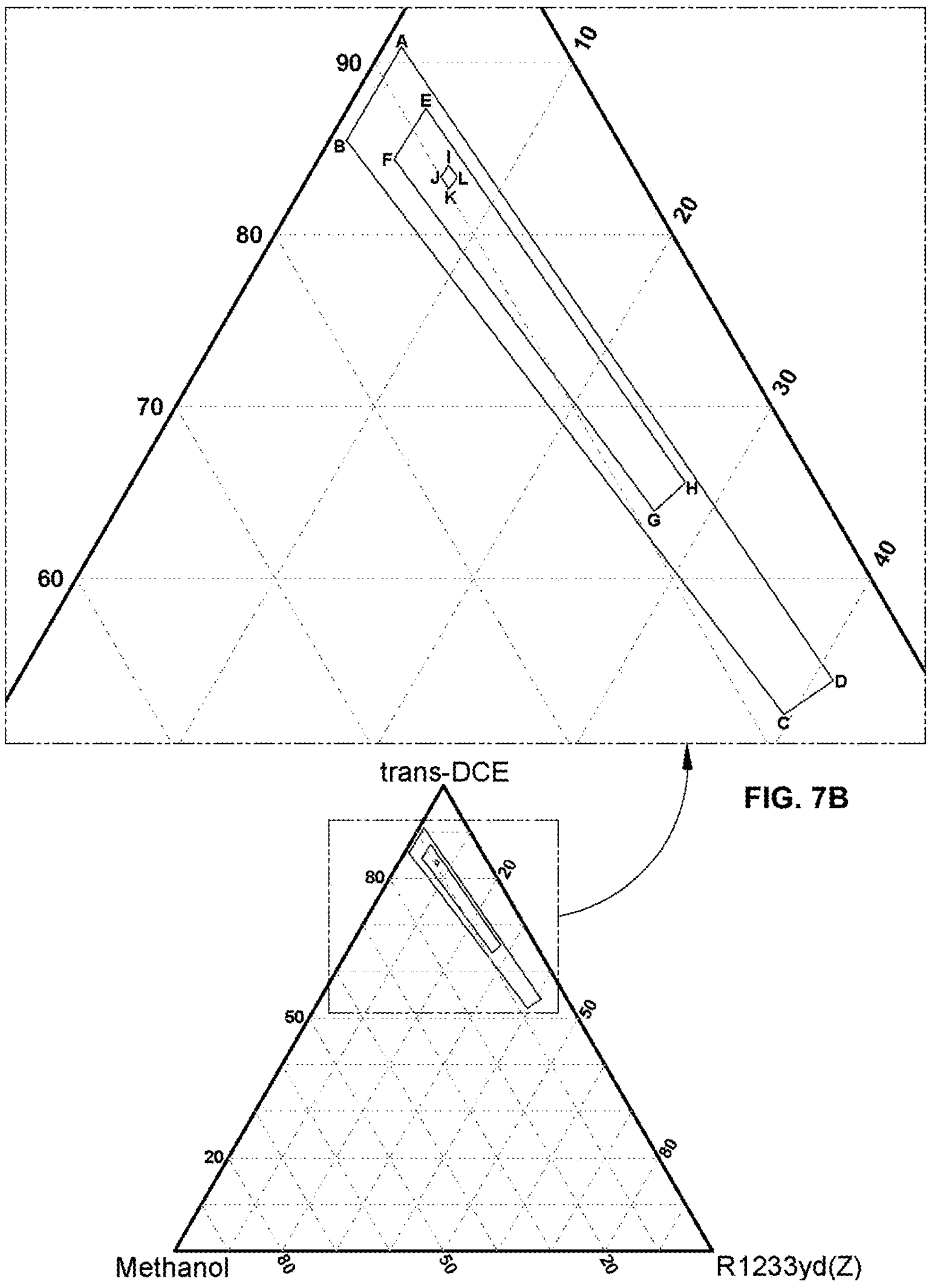
FIG. 7A is a ternary composition diagram of azeotrope or azeotrope-like compositions of (Z)-1-chloro-2,3,3-trifluoroprop-1-ene (HCFO-1233yd(Z)), methanol, and trans-dichloroethylene (trans-DCE).
FIG. 7B is a fragmentary view of a portion of FIG. 7A.

FIGS. 7A and 7B are a ternary composition diagram having (Z)-1-chloro-2,3,3-trifluoroprop-1-ene (HCFO-1233yd(Z)), methanol, and trans-dichloroethylene (trans-DCE), wherein the total concentration of the foregoing is 100 wt. %, and with points (or compositions) below as vertices of a quadrilateral bounding compositions of (Z)-1-chloro-2,3,3-trifluoroprop-1-ene (HCFO-1233yd(Z)), methanol, and trans-dichloroethylene (trans-DCE).

As shown in FIGS. 7A and 7B, the azeotrope or azeotrope-like composition of (Z)-1-chloro-2,3,3-trifluoroprop-1-ene (HCFO-1233yd(Z)), methanol, and trans-dichloroethylene (trans-DCE) may consist essentially of compositions preferably in the region enclosed by points (or compositions) "A", "B", "C", and "D", where point "A" is 0.9/8.2/90.9 wt. % HCFO-1233yd(Z)/methanol/trans-DCE, point "B" is 0.9/13.7/85.4 wt. % HCFO-1233yd(Z)/methanol/trans-DCE, point "C" is 39.6/8.3/52.1 wt. % HCFO-1233yd(Z)/methanol/trans-DCE, and point "D" is 41.1/4.9/54.0 wt. % HCFO-1233yd(Z)/methanol/trans-DCE.

More preferably, the azeotrope or azeotrope-like composition of (Z)-1-chloro-2,3,3-trifluoroprop-1-ene (HCFO-1233yd(Z)), methanol, and trans-dichloroethylene (trans-DCE) may consist essentially of compositions in the region enclosed by points (or compositions) "E", "F", "G", and "H" where point "E" is 3.9/8.7/87.4 wt. % HCFO-1233yd(Z)/methanol/trans-DCE, point "F" is 3.8/11.8/84.4 wt. % HCFO-1233yd(Z)/methanol/trans-DCE, point "G" is 27.4/8.9/63.7 wt. % HCFO-1233yd(Z)/methanol/trans-DCE, and point "H" is 28.1/6.5/65.4 wt. % HCFO-1233yd(Z)/methanol/trans-DCE.

Most preferably, the azeotrope or azeotrope-like composition of (Z)-1-chloro-2,3,3-trifluoroprop-1-ene (HCFO-1233yd(Z)), methanol, and trans-dichloroethylene (trans-DCE) may consist essentially of compositions in the region enclosed by points (or compositions) "I", "J", "K", and "L" where point "I" is 6.7/9.2/84.1 wt. % HCFO-1233yd(Z)/methanol/trans-DCE, point "J" is 6.7/10.0/83.3 wt. % HCFO-1233yd(Z)/methanol/trans-DCE, point "K" is 7.4/9.9/82.7 wt. % HCFO-1233yd(Z)/methanol/trans-DCE, and point "L" is 7.5/9.2/83.3 wt. % HCFO-1233yd(Z)/methanol/trans-DCE.

The azeotrope composition may also consist essentially of about 7.02 wt. % (Z)-1-chloro-2,3,3-trifluoroprop-1-ene, about 9.85 wt. % methanol, and about 83.13 wt. % trans-dichloroethylene.

Preferably, the azeotrope composition of the present disclosure has a boiling point of about 41.746° C.±0.001° C. at a pressure of about 14.7 psia±0.2 psia.

V. Ternary Azeotrope or Azeotrope-Like Compositions of (Z)-1-Chloro-2,3,3-Trifluoroprop-1-Ene, Ethanol, and Trans-Dichloroethylene It has been found that (Z)-1-chloro-2,3,3-trifluoroprop-1-ene (HCFO-1233yd(Z)) forms homogeneous, minimum boiling azeotrope and azeotrope-like compositions or mixtures with ethanol and trans-dichloroethylene (trans-DCE) and the present disclosure provides homogeneous azeotrope or azeotrope-like compositions preferable consisting essentially of (Z)-1-chloro-2,3,3-trifluoroprop-1-ene, ethanol, and trans-dichloroethylene. The azeotrope or azeotrope-like compositions may consist of (Z)-1-chloro-2,3,3-trifluoroprop-1-ene, ethanol, and trans-dichloroethylene.

It has been found that (Z)-1-chloro-2,3,3-trifluoroprop-1-ene, ethanol, and trans-dichloroethylene form an azeotrope or azeotrope-like composition.

The azeotrope or azeotrope-like composition of (Z)-1-chloro-2,3,3-trifluoroprop-1-ene, ethanol, and trans-dichloroethylene may be a ternary azeotrope which includes only the foregoing three components and lacks other components.

The present azeotrope or azeotrope-like compositions may preferably consist essentially of combinations of (Z)-1-chloro-2,3,3-trifluoroprop-1-ene, ethanol, and trans-dichloroethylene. The present azeotrope or azeotrope-like compositions may consist of combinations of (Z)-1-chloro-2,3,3-trifluoroprop-1-ene, ethanol, and trans-dichloroethylene.

The present disclosure also provides a method of forming an azeotrope or azeotrope-like composition by combining effective amounts of, (Z)-1-chloro-2,3,3-trifluoroprop-1-ene, ethanol, and trans-dichloroethylene. Any of a wide variety of methods known in the art for combining two or more components to form a composition can be used in the present methods. For example, (Z)-1-chloro-2,3,3-trifluoroprop-1-ene, ethanol, and trans-dichloroethylene can be mixed, blended, or otherwise combined by hand and/or by machine, as part of a batch or continuous reaction and/or process, or via combinations of two or more such steps. Each of (Z)-1-chloro-2,3,3-trifluoroprop-1-ene, ethanol, and trans-dichloroethylene are commercially available and can be procured from several different vendors. The components can be provided in the required amounts, for example by weighing and then combining the amounts.

Figure 8B:
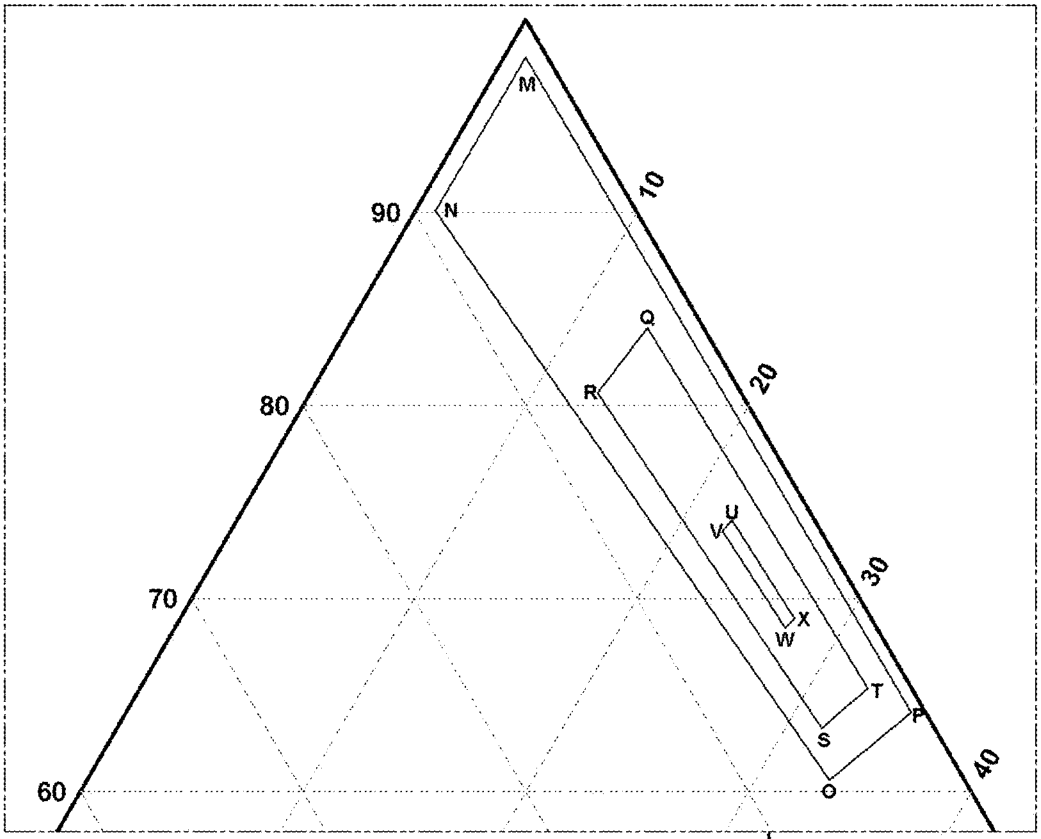
FIG. 8B is a fragmentary view of a portion of FIG. 8A.
Figure 8A:
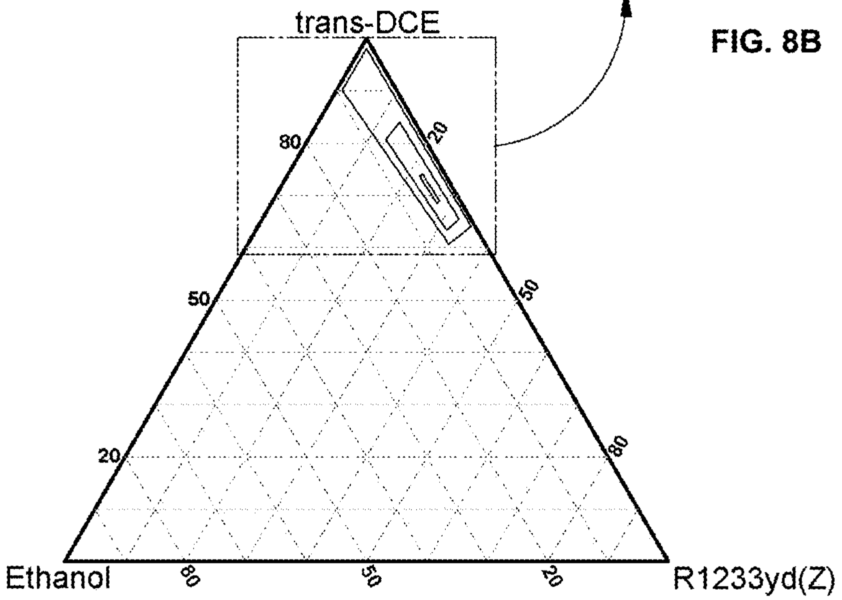
FIG. 8A is a ternary composition diagram of azeotrope or azeotrope-like compositions of (Z)-1-chloro-2,3,3-trifluoroprop-1-ene (HCFO-1233yd(Z)), ethanol, and trans-dichloroethylene (trans-DCE).

FIGS. 8A and 8B are a ternary composition diagram having (Z)-1-chloro-2,3,3-trifluoroprop-1-ene (HCFO-1233yd(Z)), ethanol, and trans-dichloroethylene (trans-DCE), wherein the total concentration of the foregoing is 100 wt. %, and with points (or compositions) below as vertices of a quadrilateral bounding compositions of (Z)-1-chloro-2,3,3-trifluoroprop-1-ene (HCFO-1233yd(Z)), ethanol, and trans-dichloroethylene (trans-DCE).

As shown in FIGS. 8A and 8B, HCFO-1233, the azeotrope or azeotrope-like composition of (Z)-1-chloro-2,3,3-trifluoroprop-1-ene (HCFO-1233yd(Z)), ethanol, and trans-DCE may consist essentially of compositions preferably in the region enclosed by points (or compositions) "M", "N", "O", and "P", where point "M" is 1.0/1.0/98.0 wt. % HCFO-1233yd(Z)/ethanol/trans-DCE, point "N" is 0.9/9.0/90.1 wt. % HCFO-1233yd(Z)/ethanol/trans-DCE, point "O" is 33.3/6.1/60.6 wt. % HCFO-1233yd(Z)/ethanol/trans-DCE, and point "P" is 35.3/0.6/64.1 wt. % HCFO-1233yd (Z)/ethanol/trans-DCE.

More preferably, the azeotrope or azeotrope-like composition of (Z)-1-chloro-2,3,3-trifluoroprop-1-ene (HCFO-1233yd(Z)), ethanol, and trans-dichloroethylene (trans-DCE) may consist essentially of compositions in the region enclosed by points (or compositions) "Q", "R", "S", and "T" where point "Q" is 13.4/2.5/84.1 wt. % HCFO-1233yd(Z)/ethanol/trans-DCE, point "R" is 12.9/6.5/80.6 wt. % HCFO-1233yd(Z)/ethanol/trans-DCE, point "S" is 31.6/5.1/63.3 wt. % HCFO-1233yd(Z)/ethanol/trans-DCE, and point "T" is 32.7/2.0/65.3 wt. % HCFO-1233yd(Z)/ethanol/trans-DCE.

Most preferably, the azeotrope or azeotrope-like composition of (Z)-1-chloro-2,3,3-trifluoroprop-1-ene (HCFO-1233yd(Z)), ethanol, and trans-dichloroethylene (trans-DCE) may consist essentially of compositions in the region enclosed by points (or compositions) "U", "V", "W", and "X" where point "U" is 22.2/3.7/74.1 wt. % HCFO-1233yd (Z)/ethanol/trans-DCE, point "V" is 22.1/4.4/73.5 wt. % HCFO-1233yd(Z)/ethanol/trans-DCE, point "W" is 27.4/4.1/68.5 wt. % HCFO-1233yd(Z)/ethanol/trans-DCE, and point "X" is 27.6/3.4/69.0 wt. % HCFO-1233yd(Z)/ethanol/trans-DCE.

The azeotrope composition may also consist essentially of about 25.04 wt. % (Z)-1-chloro-2,3,3-trifluoroprop-1-ene, about 4.11 wt. % ethanol, and about 70.85 wt. % trans-dichloroethylene.

Preferably, the azeotrope composition of the present disclosure has a boiling point of about 45.560° C.±0.002° C. at a pressure of about 14.7 psia±0.2 psia.

VI. Solvent Applications of Azeotrope and Azeotrope-Like Compositions Comprising (Z)-1-Chloro-2,3,3-Trifluoroprop-1-Ene The present disclosure contemplates solvent compositions comprising the azeotrope or azeotrope-like compositions of (Z)-1-chloro-2,3,3-trifluoroprop-1-ene (HCFO-1233yd(Z)) with ethanol, methanol, ethanol and trans-dichloroethylene (trans-DCE), or methanol and trans-dichloroethylene (trans-DCE), and solvent applications for same, i.e., Solvent Compositions 1-4.

Each of Solvent Compositions 1-4 may comprise, consist essentially of, or consist of the azeotrope or azeotrope-like compositions in an amount of at least about 5% by weight, preferably at least about 15% by weight, more preferably at least about 30% by weight, more preferably at least about 50% by weight, more preferably at least about 60% by weight, more preferably at least about 70% by weight, more preferably at least about 90% by weight, more preferably at least about 95% by weight of the composition, more preferably at least about 99% by weight of the composition.

It will be appreciated that any of the above amounts may be used to provide end points for ranges of the amount of azeotrope or azeotrope-like compositions in the solvent composition. For example, the azeotrope or azeotrope-like compositions may be present in an amount of from about 1% to about 99% by weight of the composition, or from about 5% to 95% by weight of the composition or from about 10% to about 90% by weight of the composition or from about 15% to about 70% by weight of the composition or from about 30% to about 60% by weight of the composition, or from about 40% to 50% by weight of the composition or from about 90% to about 99% by weight of the composition.

It will be appreciated that Solvent Compositions 1-4 may consist essentially of the azeotrope or azeotrope-like compositions. Solvent Compositions 1-4 may consist of the azeotrope or azeotrope-like compositions.

Each of Solvent Compositions 1-4 may independently include one or more co-solvents, selected from the group consisting of a linear, branched or cyclic hydrocarbon, a ketone, an ester, an ether, an acetal, trans-dichloroethylene (trans-DCE), an alcohol (preferably methanol, ethanol or propanol), HCFO-1233zd(E), HCFO-1233zd(Z), HCFO-1336mzz(E), HCFO-1336mzz(Z), HFE-347, Methoxytridecafluoroheptene isomers, and combinations thereof. Preferred co-solvents include trans-dichloroethylene (trans-DCE), ethanol and propanol. It will be appreciated that the propanol may be n-propanol or isopropanol, preferably isopropanol.

The co-solvent may be present in an amount of at least about 1% by weight, at least about 10% by weight, at least about 30% by weight, at least about 50% by weight, at least about 70% by weight, at least about 90% by weight, or at least about 99% of the composition.

It will be appreciated that any of the above amounts may be used to provide end points for ranges of the amount of co-solvent in the solvent composition. For example, the co-solvent may be present in an amount of from about 1% to about 99% by weight of the composition, or from about 10% to about 90% by weight of the composition, or from about 30% to about 70% by weight of the composition, or from about 40% to about 50% of the composition, or from about 1% to about 10% by weight of the composition, or from about 40% to about 90% by weight of the composition.

It will be appreciated that each of Solvent Compositions 1-4 may comprise, consist essentially of, or consist of the azeotrope or azeotrope-like compositions and one or more of the specified co-solvents.

When the co-solvent is an alcohol (preferably ethanol or propanol), it is preferably present in an amount of from about 1% to about 10% by weight of the solvent composition. The azeotrope or azeotrope-like compositions is present in an amount of from about 90% to about 99% by weight of the solvent composition. The solvent composition 1-4 may consist essentially of the azeotrope or azeotrope-like compositions and alcohol (preferably ethanol or propanol). The solvent composition may consist of the azeotrope or azeotrope-like compositions and alcohol (preferably ethanol or propanol). The propanol may be n-propanol or isopropanol, preferably isopropanol.

Each of the Solvent Compositions 1-4 preferably has a GWP of not greater than about 1000, more preferably not greater than about 500, more preferably not greater than about 150.

Each of the Solvent Compositions 1-4 may include anti-corrosive agents, surfactants, stabilizers, inhibitors and other adjuvants which assist with or enhance the functionality of the composition. Examples of stabilizers include nitroalkanes, epoxy alkanes and phosphite esters.

As an embodiment of the invention, Solvent Compositions 1-4 described herein can be used as a solvent in cleaning various polar contaminants or soils, such as rosin-based fluxes, water-based machining fluids, fingerprints, lubricants, or removal of coatings such as paints and adhesives, etc., from various substrates by wiping, vapor degreasing, aerosols or other means. In certain preferred embodiments, the cleaning composition can be used vapor degreasing, wiping and as an aerosol sprayable applications.

The invention therefore relates to the use as a solvent of a composition comprising an azeotrope or azeotrope-like composition as disclosed herein, where the composition can optionally comprise a cosolvent. Preferably, the co-solvent is an alcohol selected from ethanol, n-propanol or isopropanol. Alternatively, the composition can consist essentially of the azeotrope or azeotrope-like composition as disclosed herein.

The use of an alcohol in Solvent Compositions 1-4 enables the azeotrope or azeotrope-like composition to effectively remove such polar contaminants otherwise not effectively removed with (Z)-1-chloro-2,3,3-trifluoroprop-1-ene (HCFO-1233yd(Z)) alone.

The invention provides a method of removing a contaminant from an article comprising contacting the contaminated article with any of Solvent Compositions 1-4. Preferably, the method comprises applying any of Solvent Compositions 1-4 to the article containing the contaminant, by vapor degreasing or solvent cleaning methods. Such methods are particularly preferred for certain applications, especially those especially intricate parts and difficult to remove soils. As those skilled in the art will appreciate, the present methods have applicability to a wide variety of different cleaning and residue removal techniques, and all such techniques are within the broad scope of the present invention.

Preferred vapor degreasing and solvent cleaning methods comprise the step of exposing an article, preferably at room-temperature (e.g., about 25° C.), to the vapors of the boiling solvent composition. Vapors condensing on the object have the advantage of providing a relatively clean, distilled solvent to wash away grease or other contamination. Such processes thus have an additional advantage in that final evaporation of the present solvent composition from the object leaves behind relatively little residue as compared to the case where the object is simply washed in liquid solvent.

For applications in which the article includes contaminants that are difficult to remove, it is preferred that the present methods involve raising the temperature of Solvent Compositions 1-4 above ambient (e.g., above about 25° C.) or to any other temperature that is effective in such application to substantially improve the cleaning action of the solvent. Such processes are also generally preferred for large volume assembly line operations where the cleaning of the article, particularly metal parts and assemblies, must be done efficiently and quickly.

Preferably, the cleaning methods of the present invention comprise immersing the article to be cleaned in liquid solvent at an elevated temperature, and even more preferably at about the boiling point of the solvent composition. In such operations, this step preferably removes a substantial amount, and even more preferably a major portion, of the target contaminant from the article. This step is then preferably followed by immersing the article in solvent, preferably freshly distilled solvent, which is at a temperature below the temperature of the liquid solvent in the preceding immersion step, preferably at about ambient or room temperature (e.g. about 25° C.). The preferred methods also include the step of then contacting the article with relatively hot vapor of the present solvent composition, preferably by exposing the article to solvent vapors rising from the hot/boiling solvent associated with the first mentioned immersion step. This preferably results in condensation of the solvent vapor on the article. It will be appreciated that the article may be sprayed with distilled solvent before final rinsing.

It is contemplated that numerous varieties and types of vapor degreasing equipment may be used in connection with the present methods. One example of such equipment and its operation is disclosed by Sherliker et al. in U.S. Pat. No. 3,085,918, which is incorporated herein by reference. The equipment disclosed in Sherliker et al includes a boiling sump for containing a solvent composition, a clean sump for containing distilled solvent, a water separator, and other ancillary equipment.

The present cleaning methods may also comprise cold cleaning in which the contaminated article is either immersed in any of Solvent Compositions 1-4 under ambient or room temperature conditions (e.g., about 25° C.) or wiped under such conditions with rags or similar objects soaked in solvents. In addition, the present methods may comprise the step of applying the solvent composition to the article by spraying the composition onto the article.

Each of Solvent Compositions 1-4 are capable of effectively displacing water from a broad range of substrates including, without limitation: metals, such as stainless steel, aluminum alloys, and brass; glass and ceramic surfaces, such as glass, borosilicate glass and unglazed alumina; silica, such as silicon wafers; fired alumina; and the like. Further, the Solvent Compositions 1-4 either do not form noticeable emulsions with the displaced water or form only insignificant amounts of such emulsions.

Each of Solvent Compositions 1-4 may be used to clean and/or dry nonabsorbent substrates and articles constructed of such materials as metals, glasses, ceramics, and the like. Thus, the invention provides a method for drying the surface of a substrate comprising the steps of contacting the substrate with any of Solvent Compositions 1-4 then removing the solvent composition from the article.

The manner of contacting is not critical and may vary widely. For example, the article may be immersed in a container of the composition, or the article may be sprayed with the composition. Complete immersion of the article is preferred because it ensures contact between all exposed surfaces of the article and the composition. Any method that can provide such contact may be used. Typically, the contacting time is up to about 10 minutes, but this time is not critical and longer times may be used if desired.

The contacting temperature may also vary widely depending on the boiling point of the solvent compositions. In general, the temperature is equal to or less than about such boiling point. Following the contacting step, the article is removed from contact with the composition and removal of composition adhering to exposed surfaces of the article is affected by any conventional means such as evaporation.

Each of Solvent Compositions 1-4 may be used in an aerosol and/or a sprayable composition. Preferably, the aerosol and/or sprayable composition may have one or more additives designed for this use, such as propellants, atomizing agents and the like.

Each of Solvent Compositions 1-4 may be used as a carrier. For example, the solvent compositions may be used as a carrier for an organic substance, such as a lubricant, a coating material, a mold release agent, a water/oil repellant, an oil or a grease. The oil may be mineral oil, cutting oil or silicone oil.

It will also be appreciated that each of Solvent Compositions 1-4 may be used as a carrier for a flavor formulation or fragrance formulation.

In the manufacture of electronic circuit assemblies, contamination can accumulate throughout the various steps of the fabrication process. One of the final steps in the fabrication process is the application of soldering flux, followed by various soldering operations. The cleanliness of electronic circuit assemblies such as printed circuit boards is critical to their proper function and reliability. In practice, however, these fluxes have proven difficult to effectively remove. Thus, each of Solvent Compositions 1-4may be used to clean an electronic circuit assembly, such as a printed circuit board, during the fabrication thereof. In this use, the solvent compositions may clean solder flux residues from the electronic circuit assembly. The solder flux may be a rosin or a non-rosin (or water soluble) flux.

Each of Solvent Compositions 1-4 may be used to solvate an oil, for example, mineral oil, cutting oil or silicone oil.

Each of Solvent Compositions 1-4 may also be used as an extractant. For example, they may be used to extract organic compounds (e.g., they may be used to extract biomass or fragrances from plant matter)

EXAMPLES

Ebulliometer Study—Binary Method

For Examples 1 and 2 below, boiling point temperature was measured using an isobaric ebulliometer consisting of five sections: (1) Boiler, (2) An equilibration-section, (3) Reservoir, (4) Cottrell lift pump, (5) Condenser. A Cottrell lift pump was used to transport liquid and vapor from the boiler area up to the equilibration section. The top, or reflux condenser of the ebulliometer, was cooled with a circulating, chilled fluid (50/50 water/propylene glycol) to attain a temperature of about 15° C., which is significantly lower than the normal boiling points of 54.106° C. for (Z)-1-chloro-2,3,3-trifluoroprop-1-ene (HCFO-1233yd(Z)), 64.7° C. for methanol, 78.37° C. for ethanol, and 47.7° C. for trans-dichloroethylene (trans-DCE) at a pressure of 14.7 psia. In this manner, it was ensured that all vapors were condensed and flowed back into the equilibration-section such that the liquid and vapor phases were in equilibrium. The equilibration-section was fitted with a calibrated resistance temperature detector (RTD) with a measurement/error accuracy of ±0.001° C.

The isobaric ebulliometer was used to measure the boiling point temperature of pure and mixed fluids at ambient pressure, set via a pressure controller holding a nitrogen atmosphere of 14.7 psia. Approximately 50 mL of a first fluid was charged into the boiler and heated to reflux such that vapor/liquid were pumped via the Cottrell pump to the reflux condenser and equilibration-section. When the temperature of the condensing fluid reached a constant value, the second fluid was added to the boiler in measured increments. Sufficient time delay was allowed between additions of the second fluid to achieve proper mixing of the two fluids and thermodynamic equilibration.

The measurement was carried out by first introducing about 1 to 5 mL of ethanol or methanol having a purity of >99 area % as determined by gas chromatography (GC) into the ebulliometer via a syringe pump capable of resolving 0.001 mL. The liquid was brought to a boil and the equilibrium temperature of the ethanol or methanol was recorded at the controlled barometric pressure. Then, (Z)-1-chloro-2,3,3-trifluoroprop-1-ene having a purity of >99.9 area % as determined by gas chromatography (GC) was introduced into the ebulliometer in small, measured increments via an automated syringe pump. After a predetermined amount of (Z)-1-chloro-2,3,3-trifluoroprop-1-ene was added to the ebulliometer, the system was allowed to reach equilibrium for approximately five to thirty minutes before the equilibrium temperature of the condensing vapor-liquid mixture was recorded.

Figure 2:
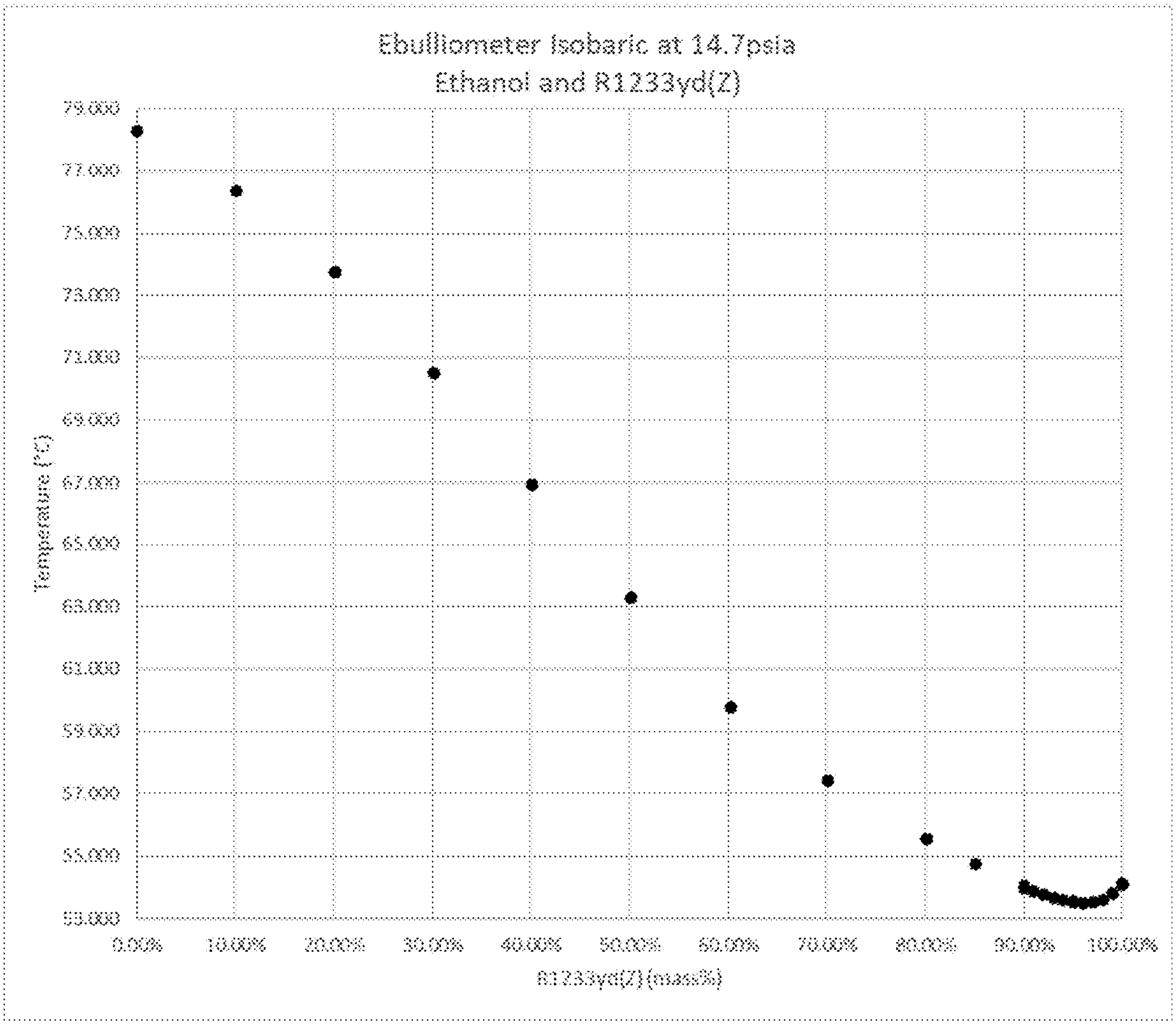
FIG. 2 illustrates the change in boiling point temperature of mixtures of (Z)-1-chloro-2,3,3-trifluoroprop-1-ene (HCFO-1233yd(Z)) and ethanol at ambient pressure according to Example 2.

Composition versus boiling point data were obtained for the composition range from 0 to 100 weight percent of (Z)-1-chloro-2,3,3-trifluoroprop-1-ene and is presented below in Tables 1 and 2, which shows a minimum in temperature which indicates that an azeotrope had been formed. These data are also shown FIGS. 1 and 2.

Example 1: Ebulliometer Study with (Z)-1-chloro-2,3,3-trifluoroprop-1-ene (HCFO-1233yd(Z)) and Methanol A minimum boiling point temperature was observed at 92.52 wt. % (Z)-1-chloro-2,3,3-trifluoroprop-1-ene and 7.48 wt. % methanol in the temperature versus weight percent (Z)-1-chloro-2,3,3-trifluoroprop-1-ene curve (FIG. 1), indicating a minimum boiling azeotrope. Observed temperature and composition data are given in Table 1.

TABLE 1

Compositions of HCFO-1233yd(Z) and methanol vs. Boiling Point Temperature at 14.7 psia.

| HCFO-1233yd(Z) Composition (wt. %) | Methanol Composition (wt. %) | Temperature (° C.) |
|---|---|---|
| 100.00% | 0.00% | 54.106 |
| 99.00% | 1.00% | 52.511 |
| 97.00% | 3.00% | 50.529 |
| 95.03% | 4.97% | 49.890 |
| 92.52% | 7.48% | 49.680 |
| 90.01% | 9.99% | 49.703 |
| 88.99% | 11.01% | 49.746 |
| 88.02% | 11.98% | 49.800 |
| 85.00% | 15.00% | 50.038 |
| 80.00% | 20.00% | 50.573 |
| 75.00% | 25.00% | 51.265 |
| 70.00% | 30.00% | 52.041 |
| 65.00% | 35.00% | 52.956 |
| 60.00% | 40.00% | 53.916 |
| 50.00% | 50.00% | 56.182 |
| 40.08% | 59.92% | 58.381 |
| 30.02% | 69.98% | 60.393 |
| 20.01% | 79.99% | 62.109 |
| 10.00% | 90.00% | 63.504 |
| 0.00% | 100.00% | 64.511 |

In view of the above data, temperature glide and relative volatility were applied to determine the azeotrope and azeotrope-like compositions.

Both the temperature glide and relative volatility of a mixture may be derived from thermodynamic measurements, such as those collected via an isobaric ebulliometer, subject to material balance and thermodynamic constraints. Several methods for deriving temperature glide and relatively volatility from thermodynamic measurements are described in Sandler, S. I. (2006). *Chapter 10: Vapor-Liquid Equilibrium in Mixtures. In Chemical, Biochemical, and Engineering Thermodynamics* ($4^{th}$ ed., pp. 489-574) which includes constraining thermodynamic consistency through the fundamental Gibbs-Duhem relationship and resolving the vapor phase composition, from the measurements, through combined mass balance and equilibrium criteria (frequently referred to as the Rachford-Rice equation or algorithm). Through this derivation, the relationship between equilibrium compositions, temperatures, and pressures are established permitting temperature glide and relative volatility to be evaluated.

For a given composition, the temperature glide, by definition, is the difference between the saturated vapor temperature and the saturated liquid temperature at a fixed pressure in thermodynamic equilibrium. Consequently, an azeotrope composition has a temperature glide of zero and an azeotrope-like composition has a temperature glide that is substantially close to zero. It has been identified that a temperature glide less than 0.5° C. is substantially close to zero and therefore compositions that satisfy such temperature glide are considered azeotrope-like. This is the broad azeotrope-like range.

The relative volatility, by definition, is the ratio of the vapor composition to the liquid composition of the most volatile component relative to the ratio of the vapor composition to the liquid composition of the less volatile component at a fixed pressure in thermodynamic equilibrium. Consequently, an azeotrope composition has a relative volatility of 1.0 and an azeotrope-like composition has a relative volatility that is substantially close to 1.0. It has been identified that a relative volatility of 1.1 is substantially close to 1.0 and therefore compositions that satisfy such relative volatility are considered azeotrope-like. This is the intermediate azeotrope-like range.

Additionally, it has been identified that a relative volatility of 1.05 is substantially close to 1.0 and therefore compositions that satisfy such relative volatility are considered azeotrope-like. This is the narrow azeotrope-like range.

Based on the above, the azeotrope-like composition may comprise from about 88 wt. % to 94 wt. % (Z)-1-chloro-2,3,3-trifluoroprop-1-ene, preferably from about 90.0 wt. % to 92.2 wt. % (Z)-1-chloro-2,3,3-trifluoroprop-1-ene, or preferably from about 90.6 wt. % to 91.7 wt. % (Z)-1-chloro-2,3,3-trifluoroprop-1-ene and from about 12 wt. % to 6 wt. % methanol, preferably from about 10.0 wt. % to 7.8 wt. % methanol, or preferably from about 9.4 wt. % to 8.3 wt. % methanol.

The true azeotrope is about 91.1 wt. % (Z)-1-chloro-2,3,3-trifluoroprop-1-ene and 8.9 wt. % methanol and has a boiling point of about 49.66° C.±0.01° C. at a pressure of about 14.7 psia±0.2 psia.

In other words, the azeotrope or azeotrope-like composition consists essentially of, or consists of, from about 88 wt. % to 94 wt. % of HCFO-1233yd(Z) and 12 wt. % to 6 wt. % methanol, from about 90.0 wt. % to 92.2 wt. % HCFO-1233yd(Z) and 10.0 wt. % to 7.8 wt. % methanol, from about 90.6 wt. % to 91.7 wt. % HCFO-1233yd(Z) and 9.4 wt. % to 8.3 wt. % methanol, or about 91.1 wt. % HCFO-1233yd(Z) and 8.9 wt. % methanol.

Example 2—Ebulliometer Study with (Z)-1-chloro-2,3,3-trifluoroprop-1-ene (HCFO-1233yd(Z)) and Ethanol A minimum boiling point temperature was observed at 96.02 wt. % (Z)-1-chloro-2,3,3-trifluoroprop-1-ene and 3.98 wt. % ethanol in the temperature versus weight percent (Z)-1-chloro-2,3,3-trifluoroprop-1-ene curve (FIG. 2), indicating a minimum boiling azeotrope. Observed temperature and composition data are given in Table 2.

TABLE 2

Compositions of HCFO-1233yd(Z) and ethanol vs. Boiling Point Temperature at 14.7 psia.

| HCFO-1233yd(Z) Composition (wt. %) | Ethanol Composition (wt. %) | Temperature (° C.) |
|---|---|---|
| 100.00% | 0.00% | 54.112 |
| 98.99% | 1.01% | 53.806 |
| 98.01% | 1.99% | 53.610 |
| 97.02% | 2.98% | 53.525 |
| 96.02% | 3.98% | 53.506 |
| 95.04% | 4.96% | 53.557 |
| 95.03% | 4.97% | 53.531 |
| 94.03% | 5.97% | 53.587 |
| 93.05% | 6.95% | 53.669 |
| 92.05% | 7.95% | 53.763 |
| 91.06% | 8.94% | 53.871 |
| 90.06% | 9.94% | 53.989 |
| 90.06% | 9.94% | 54.047 |
| 85.08% | 14.92% | 54.736 |
| 80.11% | 19.89% | 55.536 |
| 70.14% | 29.86% | 57.431 |
| 60.17% | 39.83% | 59.766 |
| 50.16% | 49.84% | 63.296 |
| 40.15% | 59.85% | 66.932 |
| 30.15% | 69.85% | 70.492 |
| 20.08% | 79.92% | 73.720 |
| 10.07% | 89.93% | 76.368 |
| 0.00% | 100.00% | 78.286 |

In view of the above data, temperature glide and relative volatility were applied to determine the azeotrope and azeotrope-like compositions.

Both the temperature glide and relative volatility of a mixture may be derived from thermodynamic measurements, such as those collected via an isobaric ebulliometer, subject to material balance and thermodynamic constraints. Several methods for deriving temperature glide and relatively volatility from thermodynamic measurements are described in Sandler, S. I. (2006). *Chapter 10: Vapor-Liquid Equilibrium in Mixtures. In Chemical, Biochemical, and Engineering Thermodynamics* ($4^{th}$ ed., pp. 489-574) which includes constraining thermodynamic consistency through the fundamental Gibbs-Duhem relationship and resolving the vapor phase composition, from the measurements, through combined mass balance and equilibrium criteria (frequently referred to as the Rachford-Rice equation or algorithm). Through this derivation, the relationship between equilibrium compositions, temperatures, and pressures are established permitting temperature glide and relative volatility to be evaluated.

For a given composition, the temperature glide, by definition, is the difference between the saturated vapor temperature and the saturated liquid temperature at a fixed pressure in thermodynamic equilibrium. Consequently, an azeotrope composition has a temperature glide of zero and an azeotrope-like composition has a temperature glide that is substantially close to zero. It has been identified that a temperature glide less than 0.5° C. is substantially close to zero and therefore compositions that satisfy such temperature glide are considered azeotrope-like. This is the broad azeotrope-like range.

The relative volatility, by definition, is the ratio of the vapor composition to the liquid composition of the most volatile component relative to the ratio of the vapor composition to the liquid composition of the less volatile component at a fixed pressure in thermodynamic equilibrium. Consequently, an azeotrope composition has a relative volatility of 1.0 and an azeotrope-like composition has a relative volatility that is substantially close to 1.0. It has been identified that a relative volatility of 1.1 is substantially close to 1.0 and therefore compositions that satisfy such relative volatility are considered azeotrope-like. This is the intermediate azeotrope-like range.

Additionally, it has been identified that a relative volatility of 1.05 is substantially close to 1.0 and therefore compositions that satisfy such relative volatility are considered azeotrope-like. This is the narrow azeotrope-like range.

Based on the above, the azeotrope-like composition may comprise from about 92.5 wt. % to 99.9 wt. % (Z)-1-chloro-2,3,3-trifluoroprop-1-ene, preferably from about 94.8 wt. % to 97.5 wt. % (Z)-1-chloro-2,3,3-trifluoroprop-1-ene, or preferably from about 95.3 wt. % to 96.4 wt. % (Z)-1-chloro-2,3,3-trifluoroprop-1-ene and from about 7.5 wt. % to 0.1 wt. % ethanol, preferably from about 5.2 wt. % to 2.5 wt. % ethanol, or preferably from about 4.7 wt. % to 3.6 wt. % ethanol.

The true azeotrope is about 95.9 wt. % (Z)-1-chloro-2,3,3-trifluoroprop-1-ene and 4.1 wt. % ethanol and has a boiling point of about 53.50° C.±0.01° C. at a pressure of about 14.7 psia±0.2 psia.

In other words, the azeotrope or azeotrope-like composition consists essentially of, or consists of, from about 92.5 wt. % to 99.9 wt. % of HCFO-1233yd(Z) and 7.5 wt. % to 0.1 wt. % ethanol, from about 94.8 wt. % to 97.5 wt. % HCFO-1233yd(Z) and 5.2 wt. % to 2.5 wt. % ethanol, from about 95.3 wt. % to 96.4 wt. % HCFO-1233yd(Z) and 4.7 wt. % to 3.6 wt. % ethanol, or about 95.9 wt. % HCFO-1233yd(Z) and 4.1 wt. % ethanol.

Ebulliometer Study—Ternary Method

For Examples 3 and 4 below, boiling point temperature was measured using an isobaric ebulliometer and its procedure as described by the Binary Method, with the key exception being the composition of the initial 50 mL material charged not being a single, pure component. First, a binary mixture was identified that followed a line of fixed composition ratio whereby the addition of a third component yielded a globally minimum temperature relative to pure component and binary azeotrope. Along this curve, the boiling temperature was measured, and the global minimum observed. For example, the isobaric ebulliometer was charged with an initial mixture of methanol and trans-dichloroethylene (trans-DCE) with a composition of 10.5 and 89.5 wt. % respectively, whereby the third component, (Z)-1-chloro-2,3,3-trifluoroprop-1-ene (HCFO-1233yd(Z)), was added incrementally until a minimum boiling temperature of 41.747° C. was detected, as shown in Table 3 of Example 3. As confirmation, the isobaric ebulliometer was reinitialized with a separate binary, incrementally adjusted by the remaining third component, yielding an intersecting composition which matched both overall composition and the global minimum temperature as the previous test. For example, a separate isobaric ebulliometer test was charged with an initial binary of (Z)-1-chloro-2,3,3-trifluoroprop-1-ene (HCFO-1233yd(Z)) and trans-dichloroethylene (trans-DCE) with a composition of 7.75 and 92.25 wt. % respectively, whereby the third component, methanol, was added incrementally until a minimum boiling temperature of 41.746° C. was detected, as shown in Table 4 of Example 3; verifying that along either fixed ratio curve, the same overall composition and minimum boiling temperature were observed.

Composition versus boiling point was obtained for two lines of fixed binary composition ratio and is presented below in Tables 3 and 4 and Tables 6 and 7 which shows a minimum in temperature which indicates that a ternary azeotrope had been formed. These data are also presented shown graphically FIGS. 3 to 6.

Example 3—Ebulliometer Study with (Z)-1-chloro-2,3,3-trifluoroprop-1-ene (HCFO-1233yd(Z)), Methanol, and Trans-Dichloroethylene (Trans-DCE)

Figure 3:
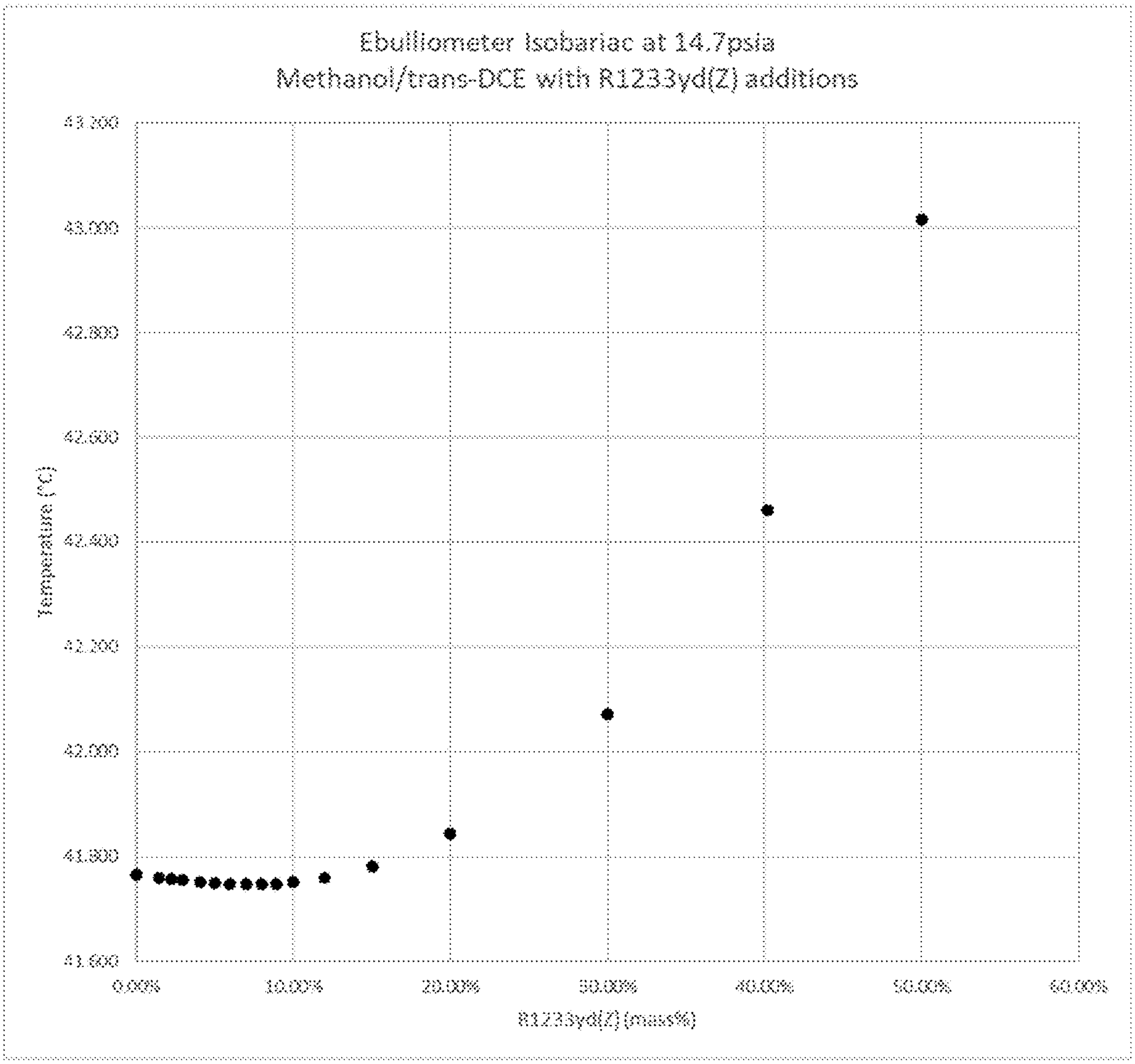
FIG. 3 illustrates the change in boiling point temperature of mixtures of (Z)-1-chloro-2,3,3-trifluoroprop-1-ene (HCFO-1233yd(Z)), methanol, and trans-dichloroethylene (trans-DCE) held at a fixed mass ratio of 0.1173 of methanol to trans-DCE, at ambient pressure according to Example 3.
Figure 4:
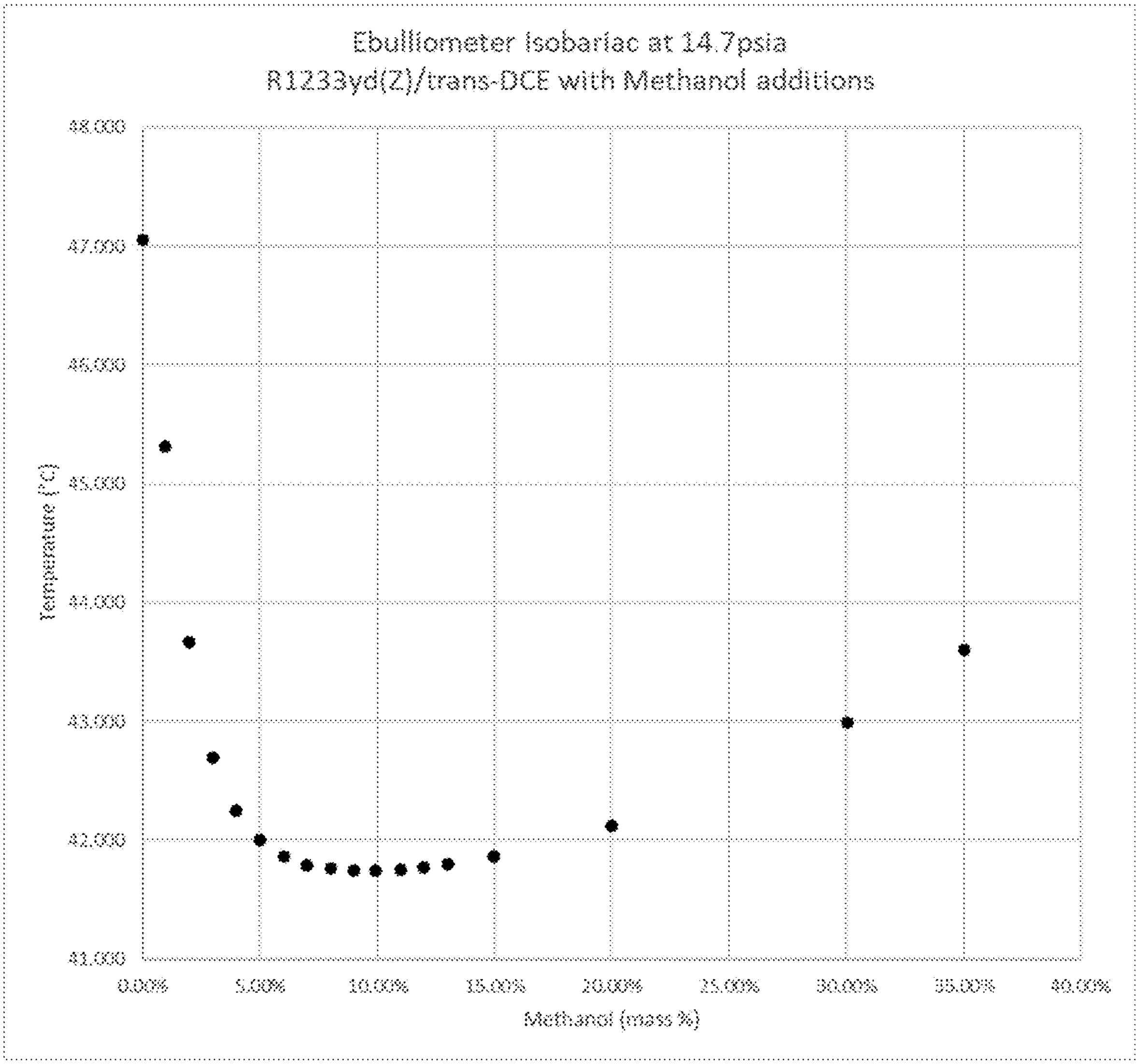
FIG. 4 illustrates the change in boiling point temperature of mixtures of (Z)-1-chloro-2,3,3-trifluoroprop-1-ene (HCFO-1233yd(Z)), methanol, and trans-dichloroethylene (trans-DCE), held at a fixed mass ratio of 0.0840 of HCFO-1233yd(Z) to trans-DCE, at ambient pressure according to Example 3.

As shown in Table 3 and FIG. 3, a minimum boiling point temperature of 41.747° C. was observed at 7.05 wt. % (Z)-1-chloro-2,3,3-trifluoroprop-1-ene, 9.76 wt. % methanol, and 83.19 wt. % trans-dichloroethylene when (Z)-1-chloro-2,3,3-trifluoroprop-1-ene was added to a mixture of methanol and trans-dichloroethylene, maintained at a fix mass ratio of 0.1173, in an isobaric ebulliometer at 14.7 psia. Similarly, Table 4 and FIG. 4 shows that a minimum boiling point temperature of 41.746° C. was observed at 6.98 wt. % (Z)-1-chloro-2,3,3-trifluoroprop-1-ene, 9.95 wt. % methanol, and 83.08 wt. % trans-dichloroethylene when methanol was added to a mixture of (Z)-1-chloro-2,3,3-trifluoroprop-1-ene and trans-dichloroethylene, maintained at a fix mass ratio of 0.0840, in an isobaric ebulliometer at 14.7 psia. The intersection of these curves was observed to form a globally minimum temperature of 41.746° C.±0.001° C. with an intersecting average composition of 7.02 wt. % (Z)-1-chloro-2,3,3-trifluoroprop-1-ene, 9.85 wt. % methanol, and 83.18 wt. % trans-dichloroethylene indicating that a ternary azeotrope was formed. This global minimum temperature was confirmed when the intersecting composition's boiling temperature was compared to the saturation temperature of each pure and binary azeotrope found within the system, summarized in Table 5.

TABLE 3

Compositions of (Z)-1-chloro-2,3,3-trifluoroprop-1-ene (HCFO-1233yd(Z)), methanol, and trans-dichloroethylene (trans-DCE) vs. Boiling Point Temperature at 14.7 psia, along a fixed mass ratio of 0.1173 methanol to trans-dichloroethylene (trans-DCE).

| HCFO-1233yd(Z) Composition (wt. %) | Methanol Composition (wt. %) | trans-DCE Composition (wt. %) | Temperature (° C.) |
|---|---|---|---|
| 0.00% | 10.50% | 89.50% | 41.766 |
| 1.49% | 10.34% | 88.17% | 41.760 |
| 2.24% | 10.26% | 87.50% | 41.758 |
| 2.98% | 10.19% | 86.83% | 41.755 |
| 4.15% | 10.06% | 85.79% | 41.751 |
| 5.05% | 9.97% | 84.98% | 41.749 |
| 5.98% | 9.87% | 84.15% | 41.748 |
| 7.05% | 9.76% | 83.19% | 41.747 |
| 8.04% | 9.65% | 82.30% | 41.748 |
| 8.97% | 9.56% | 81.47% | 41.748 |
| 10.02% | 9.45% | 80.53% | 41.751 |
| 12.00% | 9.24% | 78.76% | 41.760 |
| 15.01% | 8.92% | 76.07% | 41.782 |
| 20.04% | 8.39% | 71.57% | 41.843 |
| 30.03% | 7.35% | 62.63% | 42.071 |
| 40.20% | 6.28% | 53.53% | 42.461 |
| 50.01% | 5.25% | 44.74% | 43.017 |

TABLE 4

Compositions of (Z)-1-chloro-2,3,3-trifluoroprop-1-ene (HCFO-1233yd(Z)), methanol, and trans-dichloroethylene (trans-DCE) vs. Boiling Point Temperature at 14.7 psia, along a fixed mass ratio of 0.0840 HCFO-1233yd(Z) to trans-dichloroethylene (trans-DCE).

| Methanol Composition (wt. %) | HCFO-1233yd(Z) Composition (wt. %) | trans-DCE Composition (wt. %) | Temperature (° C.) |
|---|---|---|---|
| 0.00% | 7.75% | 92.25% | 47.059 |
| 0.99% | 7.67% | 91.34% | 45.317 |
| 1.99% | 7.59% | 90.42% | 43.664 |
| 3.03% | 7.51% | 89.46% | 42.699 |
| 3.98% | 7.44% | 88.58% | 42.254 |
| 4.99% | 7.36% | 87.65% | 42.001 |
| 6.04% | 7.28% | 86.68% | 41.866 |
| 7.03% | 7.20% | 85.77% | 41.797 |
| 8.03% | 7.13% | 84.84% | 41.761 |
| 8.99% | 7.05% | 83.96% | 41.747 |
| 9.95% | 6.98% | 83.08% | 41.746 |
| 10.99% | 6.90% | 82.12% | 41.756 |
| 11.98% | 6.82% | 81.20% | 41.773 |
| 13.04% | 6.74% | 80.22% | 41.799 |
| 14.99% | 6.59% | 78.42% | 41.865 |
| 20.01% | 6.20% | 73.79% | 42.121 |
| 30.05% | 5.42% | 64.53% | 42.991 |
| 35.03% | 5.03% | 59.94% | 43.607 |

TABLE 5

Summary of minimum Boiling Temperature at 14.7 psia for components and mixtures of (Z)-1-chloro-2,3,3-trifluoroprop-1-ene (HCFO-1233yd(Z)), methanol, and/or trans-dichloroethylene (trans-DCE). Global minimum temperature was observed at 7.02/9.85/83.13 wt. % of HCFO-1233yd(Z)/methanol/trans-DCE, a ternary azeotrope.

| Measurement type | HCFO-1233yd(Z) (wt. %) | Methanol (wt. %) | trans-DCE (wt. %) | Minimum Temperature (° C.) |
|---|---|---|---|---|
| Pure Component | | >99% | | 64.511 |
| | >99% | | | 54.106 |
| | | | >99% | 47.723 |
| Binary Azeotrope | 92.52% | 7.48% | | 49.680 |
| Ternary Azeotrope: Fixed Methanol/trans-DCE | 7.05% | 9.76% | 83.19% | 41.747 |
| Ternary Azeotrope: Fixed HCFO-1233yd(Z)/trans-DCE | 6.98% | 9.95% | 83.08% | 41.746 |
| Ternary Azeotrope: Curve Intersection | 7.02% | 9.85% | 83.13% | 41.746 |

Example 4—Ebulliometer Study with HCFO-1233yd(Z), ethanol, and trans-dichloroethylene (trans-DCE)

Figure 5:
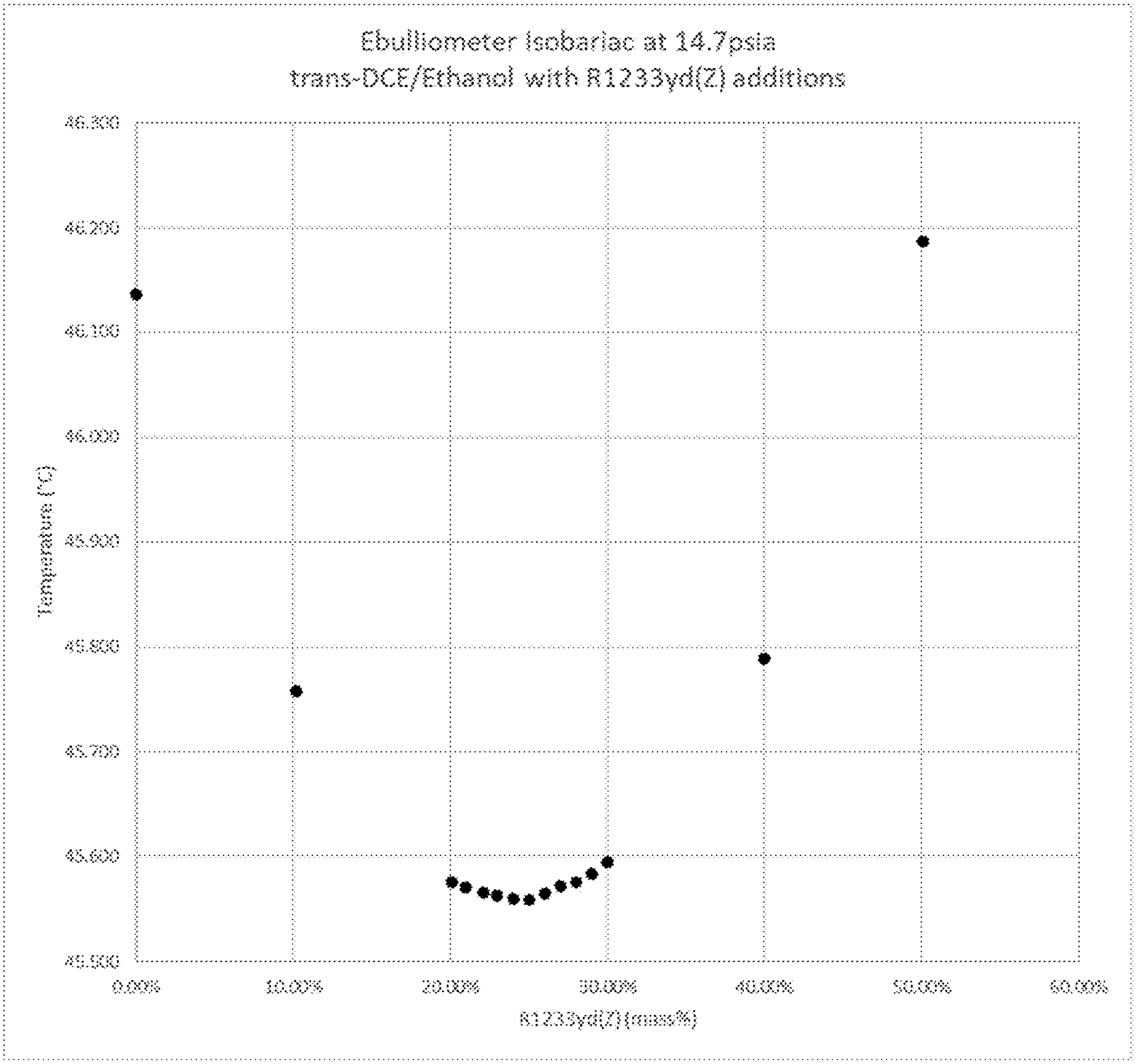
FIG. 5 illustrates the change in boiling point temperature of mixtures of (Z)-1-chloro-2,3,3-trifluoroprop-1-ene (HCFO-1233yd(Z)), ethanol, and trans-dichloroethylene (trans-DCE), held at a fixed mass ratio of 0.0595 of ethanol to trans-DCE, at ambient pressure according to Example 4.
Figure 6:
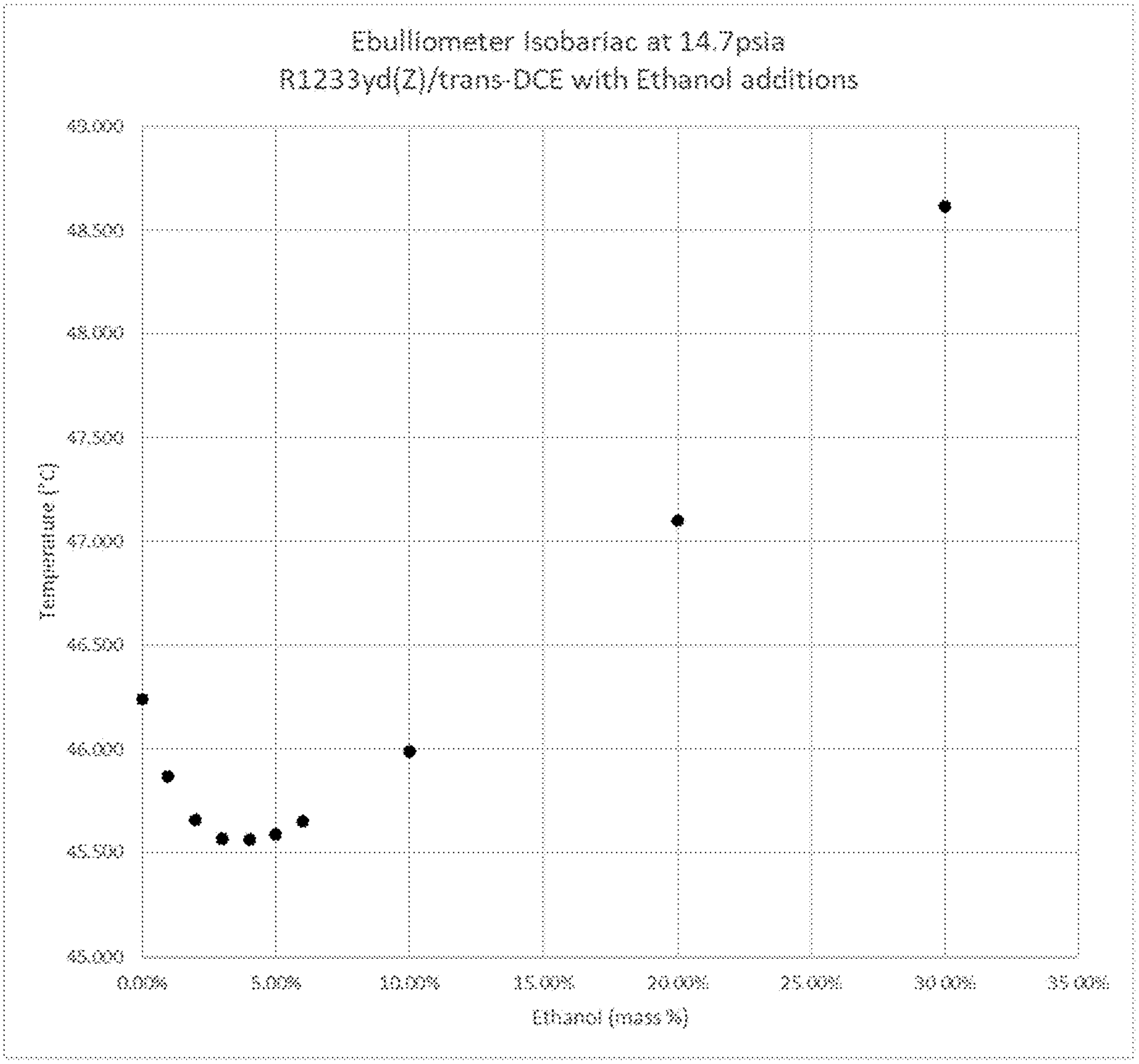
FIG. 6 illustrates the change in boiling point temperature of mixtures of (Z)-1-chloro-2,3,3-trifluoroprop-1-ene (HCFO-1233yd(Z)), ethanol, and trans-dichloroethylene (trans-DCE), held at a fixed mass ratio of 0.3538 of (Z)-1-chloro-2,3,3-trifluoroprop-1-ene (HCFO-1233yd(Z)) to trans-dichloroethylene (trans-DCE), at ambient pressure according to Example 4.

As shown in Table 6 and FIG. 5, a minimum boiling point temperature of 45.558° C. was observed at 25.00 wt. % (Z)-1-chloro-2,3,3-trifluoroprop-1-ene, 4.21 wt. % ethanol, and 70.79 wt. % trans-dichloroethylene when (Z)-1-chloro-2,3,3-trifluoroprop-1-ene was added to a mixture of ethanol and trans-dichloroethylene, maintained at a fix mass ratio of 0.0595, in an isobaric ebulliometer at 14.7 psia. Similarly, Table 7 and FIG. 6 shows that a minimum boiling point temperature of 45.561° C. was observed at 25.09 wt. % (Z)-1-chloro-2,3,3-trifluoroprop-1-ene, 4.00 wt. % ethanol, and 70.91 wt. % trans-dichloroethylene when ethanol was added to a mixture of (Z)-1-chloro-2,3,3-trifluoroprop-1-ene and trans-dichloroethylene, maintained at a fix mass ratio of 0.3538, in an isobaric ebulliometer at 14.7 psia. The intersection of these curves was observed to form a globally minimum temperature of 45.560° C.±0.002° C. with an intersecting average composition of 25.04 wt. % (Z)-1-chloro-2,3,3-trifluoroprop-1-ene, 4.11 wt. % ethanol, and 70.85 wt. % trans-dichloroethylene indicating that a ternary azeotrope was formed. This global minimum temperature was confirmed when the intersecting composition's boiling temperature was compared to the saturation temperature of each pure and binary azeotrope found within the system, summarized in Table 8.

TABLE 6

Compositions of HCFO-1233yd(Z), ethanol, and trans-dichloroethylene (trans-DCE) vs. Boiling Point Temperature at 14.7 psia, along a fixed mass ratio of 0.0595 ethanol to trans-DCE.

| HCFO-1233yd(Z) Composition (wt. %) | Ethanol Composition (wt. %) | trans-DCE Composition (wt. %) | Temperature (° C.) |
|---|---|---|---|
| 0.00% | 5.61% | 94.39% | 46.135 |
| 10.19% | 5.04% | 84.77% | 45.758 |
| 20.09% | 4.48% | 75.42% | 45.576 |
| 21.00% | 4.43% | 74.57% | 45.570 |
| 22.10% | 4.37% | 73.53% | 45.565 |
| 22.98% | 4.32% | 72.69% | 45.562 |
| 23.99% | 4.27% | 71.74% | 45.560 |
| 25.00% | 4.21% | 70.79% | 45.558 |
| 26.01% | 4.15% | 69.84% | 45.565 |
| 27.02% | 4.10% | 68.88% | 45.571 |
| 28.00% | 4.04% | 67.96% | 45.575 |
| 29.00% | 3.98% | 67.01% | 45.583 |
| 30.00% | 3.93% | 66.07% | 45.594 |
| 40.00% | 3.37% | 56.63% | 45.789 |
| 50.01% | 2.81% | 47.18% | 46.187 |

TABLE 7

Compositions of (Z)-1-chloro-2,3,3-trifluoroprop-1-ene (HCFO-1233yd(Z)), ethanol, and trans-dichloroethylene (trans-DCE) vs. Boiling Point Temperature at 14.7 psia, along a fixed mass ratio of 0.3538 HCFO-1233yd(Z) to trans-DCE.

| Ethanol Composition (wt. %) | HCFO-1233yd(Z) Composition (wt. %) | trans-DCE Composition (wt. %) | Temperature (° C.) |
|---|---|---|---|
| 0.00% | 26.13% | 73.87% | 46.242 |
| 0.98% | 25.88% | 73.14% | 45.872 |
| 2.00% | 25.61% | 72.39% | 45.655 |
| 3.01% | 25.35% | 71.65% | 45.567 |
| 4.00% | 25.09% | 70.91% | 45.561 |
| 5.00% | 24.83% | 70.17% | 45.591 |
| 6.00% | 24.56% | 69.43% | 45.652 |
| 10.00% | 23.52% | 66.48% | 45.990 |
| 20.00% | 20.91% | 59.09% | 47.107 |
| 30.00% | 18.29% | 51.71% | 48.617 |

TABLE 8

Summary of minimum Boiling Temperature at 14.7 psia for components and mixtures of (Z)-1-chloro-2,3,3-trifluoroprop-1-ene (HCFO-1233yd(Z)), ethanol, and/or trans-dichloroethylene (trans-DCE). Global minimum temperature was observed at 25.04/4.11/70.85 wt. % of HCFO-1233yd(Z)/ethanol/trans-DCE, a ternary azeotrope.

| Measurement type | HCFO-1233yd(Z) (wt. %) | Ethanol (wt. %) | trans-DCE (wt. %) | Minimum Temperature (° C.) |
|---|---|---|---|---|
| Pure Component | | >99% | | 78.286 |

TABLE 8-continued

Summary of minimum Boiling Temperature at 14.7 psia for components and mixtures of (Z)-1-chloro-2,3,3-trifluoroprop-1-ene (HCFO-1233yd(Z)), ethanol, and/or trans-dichloroethylene (trans-DCE). Global minimum temperature was observed at 25.04/4.11/70.85 wt. % of HCFO-1233yd(Z)/ethanol/trans-DCE, a ternary azeotrope.

| Measurement type | HCFO-1233yd(Z) (wt. %) | Ethanol (wt. %) | trans-DCE (wt. %) | Minimum Temperature (° C.) |
|---|---|---|---|---|
| | >99% | | | 54.106 |
| | | | >99% | 47.723 |
| Binary Azeotrope | 96.02% | 3.98% | | 53.506 |
| Ternary Azeotrope - Fixed Ethanol/trans-DCE | 25.00% | 4.21% | 70.79% | 45.558 |
| Ternary Azeotrope - Fixed HCFO-1233yd(Z)/trans-DCE | 25.09% | 4.00% | 70.91% | 45.561 |
| Ternary Azeotrope - Intersection | 25.04% | 4.11% | 70.85% | 45.560 |

Example 5

Ternary Azeotrope or Azeotrope-Like Compositions of (Z)-1-chloro-2,3,3-trifluoroprop-1-ene (HCFO-1233yd(Z)), methanol, and trans-dichloroethylene (trans-DCE)

Given the thermodynamic observations for pure, binary, and ternary compositions described in Example 1 and Example 3, ternary compositions of (Z)-1-chloro-2,3,3-trifluoroprop-1-ene (HCFO-1233yd(Z)), methanol, and trans-dichloroethylene (trans-DCE) were found to behave as azeotrope-like compositions. These compositions were found to boil at substantially constant temperatures and provide a composition of vapor and liquid that are substantially identical each other, described by relative volatility and temperature glides considerations, derived from the thermodynamic measurements, given by the methods and criteria established in Example 1. Ternary azeotrope-like compositions of HCFO-1233yd(Z), methanol, and trans-DCE were found within compositional regions that contain the ternary azeotrope and are shown in the FIG. 7A ternary diagram. These compositional regions can be described by points on the ternary diagram corresponding vertices of a quadrilateral which enclose ternary azeotrope and azeotrope-like compositions of HCFO-1233yd(Z), methanol and trans-DCE; the labels for each compositional region vertices are shown in FIG. 7B with compositions summarized in Table 9.

TABLE 9

Compositions for vertices of a quadrilateral composition region that enclose azeotrope and azeotrope-like compositions of HCFO-1233yd(Z), methanol, and trans-DCE with labels corresponding to FIG. 7B.

| Label | HCFO-1233yd(Z) Composition (wt. %) | Methanol Composition (wt. %) | trans-DCE Composition (wt. %) |
|---|---|---|---|
| A | 0.9% | 8.2% | 90.9% |
| B | 0.9% | 13.7% | 85.4% |
| C | 39.6% | 8.3% | 52.1% |
| D | 41.1% | 4.9% | 54.0% |
| E | 3.9% | 8.7% | 87.4% |
| F | 3.8% | 11.8% | 84.4% |
| G | 27.4% | 8.9% | 63.7% |
| H | 28.1% | 6.5% | 65.4% |
| I | 6.7% | 9.2% | 84.1% |
| J | 6.7% | 10.0% | 83.3% |
| K | 7.4% | 9.9% | 82.7% |
| L | 7.5% | 9.2% | 83.3% |

Example 6

Ternary azeotrope or azeotrope-like compositions of (Z)-1-chloro-2,3,3-trifluoroprop-1-ene (HCFO-1233yd(Z)), ethanol, and trans-dichloroethylene (trans-DCE)

Given the thermodynamic observations for pure, binary, and ternary compositions described in Example 2 and Example 4, ternary compositions of (Z)-1-chloro-2,3,3-trifluoroprop-1-ene (HCFO-1233yd(Z)), ethanol, and trans-dichloroethylene (trans-DCE) were found to behave as azeotrope-like compositions. These compositions were found to boil at substantially constant temperatures and provide a composition of vapor and liquid that are substantially identical each other, described by relative volatility and temperature glides considerations, derived from the thermodynamic measurements, given by the methods and criteria established in Example 2. Ternary azeotrope-like compositions of HCFO-1233yd(Z), ethanol, and trans-DCE were found within compositional regions that contain the ternary azeotrope and are shown in the FIG. 8A ternary diagram. These compositional regions can be described by points on the ternary diagram corresponding vertices of a quadrilateral which enclose ternary azeotrope and azeotrope-like compositions of HCFO-1233yd(Z), ethanol and trans-DCE; the labels for each compositional region vertices are shown in FIG. 8B with compositions summarized in Table 10.

TABLE 10

Compositions for vertices of a quadrilateral composition region that enclose azeotrope and azeotrope-like compositions of HCFO-1233yd(Z), ethanol, and trans-DCE with labels corresponding to FIG. 8B.

| Label | HCFO-1233yd(Z) Composition (wt. %) | Ethanol Composition (wt. %) | trans-DCE Composition (wt. %) |
|---|---|---|---|
| M | 1.0% | 1.0% | 98.0% |
| N | 0.9% | 9.0% | 90.1% |
| O | 33.3% | 6.1% | 60.6% |
| P | 35.3% | 0.6% | 64.1% |
| Q | 13.4% | 2.5% | 84.1% |
| R | 12.9% | 6.5% | 80.6% |
| S | 31.6% | 5.1% | 63.3% |
| T | 32.7% | 2.0% | 65.3% |
| U | 22.2% | 3.7% | 74.1% |
| V | 22.1% | 4.4% | 73.5% |
| W | 27.4% | 4.1% | 68.5% |
| X | 27.6% | 3.4% | 69.0% |

Example 7

Each of Solvent Compositions 1-4 including the present azeotrope or azeotrope-like compositions are loaded into aerosol cans. An aerosol valve is crimped into place on each can and any of Solvent Compositions 1-4 are added through the valves to achieve a pressure in the cans of about 20 PSIG. The compositions are then sprayed onto surfaces demonstrating that the compositions are useful as an aerosol.

Additionally, the aerosol compositions are sprayed onto surfaces which include oil, grease, dirt, or solder flux, and are effective in solvating and removing such materials.

Example 8

Solvent Compositions 1-4 including the present azeotrope or azeotrope-like compositions are loaded into aerosol cans. Aerosol valves are crimped into place and any of Solvent Compositions 1-4 are added through the valves to achieve a pressure in the cans of about 20 PSIG. The compositions are then sprayed onto metal coupons soiled with solder flux. The flux is removed, and the coupons are visually clean.

Example 9

Example 8 above is repeated, except the method of applying the compositions as cleaning agents is immersion degreasing, vapor degreasing or wiping instead of spraying. Optionally, the cleaning agents are applied neat. Optionally, the materials to be cleaned are changed from solder fluxes to mineral oils, silicon oils, or other lubricants. Similar results are demonstrated in each case.

Example 10

Solvent Compositions 1-4 are provided, as well as several stainless-steel coupons that are soiled with mineral oil. Then these coupons are immersed in each of Solvent Compositions 1-4. Each of Solvent Compositions 1-4 remove the oils in a short period of time. The coupons are observed visually and look clean.

Example 11

Aerosol solvents are prepared containing each of Solvent Compositions 1-4. Kester 1544 Rosin Soldering Flux is placed on stainless steel coupons and heated to approximately 300-400° F., which simulates contact with a wave soldier normally used to solder electronic components in the manufacture of printed circuit boards. The coupons are then sprayed with the solvents and removed after 15 seconds without rinsing. Results show that the coupons appear clean by visual inspection.

Example 12

Each of Solvent Compositions 1-4 are used as solvating agents for removing paints, coatings, and adhesives from surfaces. The solvating agents are effective for solvating the paints, coatings, and adhesives and allowing the removal of same from the surfaces.

Example 13

Kester 1544 Rosin Soldering Flux is placed on stainless steel coupons and heated to approximately 300-400° F., which simulates contact with a wave soldier normally used to solder electronic components in the manufacture of printed circuit boards. The coupons are then cleaned with each of Solvent Compositions 1-4 by immersion degreasing or vapor degreasing. Results show that the coupons appear clean by visual inspection.

ASPECTS

Aspect 1 is a composition consisting essentially of from about 88 wt. % to about 94 wt. % (Z)-1-chloro-2,3,3-trifluoroprop-1-ene and from about 6 wt. % to about 12 wt. % methanol.

Aspect 2 is the composition of Aspect 1, wherein the composition consists essentially of from about 90 wt. % to 92.2 wt. % (Z)-1-chloro-2,3,3-trifluoroprop-1-ene and from about 7.8 wt. % to about 10 wt. % methanol.

Aspect 3 is the composition of Aspect 1 or Aspect 2, wherein the composition consists essentially of from about 90.6 wt. % to about 91.7 wt. % (Z)-1-chloro-2,3,3-trifluoroprop-1-ene and from about 8.3 wt. % to about 9.4 wt. % methanol.

Aspect 4 is the composition of any of Aspects 1-3, wherein the composition consists essentially of about 91.1 wt. % (Z)-1-chloro-2,3,3-trifluoroprop-1-ene and about 8.9 wt. % methanol.

Aspect 5 is a composition consisting of from about 88 wt. % to about 94 wt. % (Z)-1-chloro-2,3,3-trifluoroprop-1-ene and from about 6 wt. % to about 12 wt. % methanol.

Aspect 6 is the composition of Aspect 5, wherein the composition consists of from about 90 wt. % to 92.2 wt. % (Z)-1-chloro-2,3,3-trifluoroprop-1-ene and from about 7.8 wt. % to about 10 wt. % methanol.

Aspect 7 is the composition of Aspect 5 or Aspect 6, wherein the composition consists of from about 90.6 wt. % to about 91.7 wt. % (Z)-1-chloro-2,3,3-trifluoroprop-1-ene and from about 8.3 wt. % to about 9.4 wt. % methanol.

Aspect 8 is the composition of any of Aspects 5-7, wherein the composition consists of about 91.1 wt. % (Z)-1-chloro-2,3,3-trifluoroprop-1-ene and about 8.9 wt. % methanol.

Aspect 9 is an azeotrope or azeotrope-like composition consisting essentially of from about 88 wt. % to about 94 wt. % (Z)-1-chloro-2,3,3-trifluoroprop-1-ene and from about 6 wt. % to about 12 wt. % methanol.

Aspect 10 composition of Aspect 9, wherein the composition is an azeotrope or azeotrope-like composition consisting essentially of from about 90 wt. % to 92.2 wt. % (Z)-1-chloro-2,3,3-trifluoroprop-1-ene and from about 7.8 wt. % to about 10 wt. % methanol.

Aspect 11 is the composition of Aspect 9 or Aspect 10, wherein the composition is an azeotrope or azeotrope-like composition consisting essentially of from about 90.6 wt. % to about 91.7 wt. % (Z)-1-chloro-2,3,3-trifluoroprop-1-ene and from about 8.3 wt. % to about 9.4 wt. % methanol.

Aspect 12 is the composition of any of Aspects 9-11, wherein the composition is an azeotrope or azeotrope-like composition consisting essentially of about 91.1 wt. % (Z)-1-chloro-2,3,3-trifluoroprop-1-ene and about 8.9 wt. % methanol.

Aspect 13 is an azeotrope or azeotrope-like composition consisting of from about 88 wt. % to about 94 wt. % (Z)-1-chloro-2,3,3-trifluoroprop-1-ene and from about 6 wt. % to about 12 wt. % methanol.

Aspect 14 is the composition of Aspect 13, wherein the composition is an azeotrope or azeotrope-like composition consisting of from about 90 wt. % to 92.2 wt. % (Z)-1-chloro-2,3,3-trifluoroprop-1-ene and from about 7.8 wt. % to about 10 wt. % methanol.

Aspect 15 is the composition of Aspect 13 or Aspect 14, wherein the composition is an azeotrope or azeotrope-like composition consisting of from about 90.6 wt. % to about 91.7 wt. % (Z)-1-chloro-2,3,3-trifluoroprop-1-ene and from about 8.3 wt. % to about 9.4 wt. % methanol.

Aspect 16 is the composition of any of Aspects 5-7, wherein the composition is an azeotrope or azeotrope-like composition consisting of about 91.1 wt. % (Z)-1-chloro-2,3,3-trifluoroprop-1-ene and about 8.9 wt. % methanol.

Aspect 17 is the composition of any of Aspects 9-16, wherein the azeotrope or azeotrope-like composition has a boiling point of about 49.66° C.±0.001° C. at a pressure of about 14.7 psia±0.2 psia.

Aspect 18 is a composition consisting essentially of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices:

point A: ((Z)-1-chloro-2,3,3-trifluoroprop-1-ene/methanol/trans-dichloroethylene=about 0.9 wt. %/about 8.2 wt. %/about 90.9 wt. %);

point B: ((Z)-1-chloro-2,3,3-trifluoroprop-1-ene/methanol/trans-dichloroethylene=about 0.9 wt. %/about 13.7 wt. %/about 85.4 wt. %);

point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

Aspect 19 is the composition of Aspect 18, consisting essentially of (Z)-1-chloro-2,3,3-trifluoroprop-1-ene, methanol, and trans-dichloroethylene are within a quadrilateral region having the following points as vertices:

point E: ((Z)-1-chloro-2,3,3-trifluoroprop-1-ene/methanol/trans-dichloroethylene=about 3.9 wt. %/about 8.7 wt. %/about 87.4 wt. %);

point F: ((Z)-1-chloro-2,3,3-trifluoroprop-1-ene/methanol/trans-dichloroethylene=about 3.8 wt. %/about 11.8 wt. %/about 84.4 wt. %);

point G: ((Z)-1-chloro-2,3,3-trifluoroprop-1-ene/methanol/trans-dichloroethylene=about 27.4 wt. %/about 8.9 wt. %/about 63.7 wt. %); and point H: ((Z)-1-chloro-2,3,3-trifluoroprop-1-ene/methanol/trans-dichloroethylene=about 28.1 wt. %/about 6.5 wt. %/about 65.4 wt. %).

Aspect 20 is the composition of Aspect 18 or Aspect 19, consisting essentially of (Z)-1-chloro-2,3,3-trifluoroprop-1-ene, methanol, and trans-dichloroethylene are within a quadrilateral region having the following points as vertices:

point I: ((Z)-1-chloro-2,3,3-trifluoroprop-1-ene/methanol/trans-dichloroethylene=about 6.7 wt. %/about 9.2 wt. %/about 84.1 wt. %);

point J: ((Z)-1-chloro-2,3,3-trifluoroprop-1-ene/methanol/trans-dichloroethylene=about 6.7 wt. %/about 10.0 wt. %/about 83.3 wt. %);

point K: ((Z)-1-chloro-2,3,3-trifluoroprop-1-ene/methanol/trans-dichloroethylene=about 7.4 wt. %/about 9.9 wt. %/about 82.7 wt. %); and point L: ((Z)-1-chloro-2,3,3-trifluoroprop-1-ene/methanol/trans-dichloroethylene=about 7.5 wt. %/about 9.2 wt. %/about 83.3 wt. %).

Aspect 21 is the composition of any of Aspects 18-20, consisting essentially of the (Z)-1-chloro-2,3,3-trifluoroprop-1-ene, methanol, and trans-dichloroethylene are present in amounts of about 7.02 wt. %, about 9.85 wt. %, and about 83.13 wt. %, respectively.

Aspect 22 is a composition consisting of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices:

point A: ((Z)-1-chloro-2,3,3-trifluoroprop-1-ene/methanol/trans-dichloroethylene=about 0.9 wt. %/about 8.2 wt. %/about 90.9 wt. %);

point B: ((Z)-1-chloro-2,3,3-trifluoroprop-1-ene/methanol/trans-dichloroethylene=about 0.9 wt. %/about 13.7 wt. %/about 85.4 wt. %);

point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

Aspect 23 is the composition of Aspect 22, consisting of (Z)-1-chloro-2,3,3-trifluoroprop-1-ene, methanol, and trans-dichloroethylene are within a quadrilateral region having the following points as vertices:

point E: ((Z)-1-chloro-2,3,3-trifluoroprop-1-ene/methanol/trans-dichloroethylene=about 3.9 wt. %/about 8.7 wt. %/about 87.4 wt. %);

point F: ((Z)-1-chloro-2,3,3-trifluoroprop-1-ene/methanol/trans-dichloroethylene=about 3.8 wt. %/about 11.8 wt. %/about 84.4 wt. %);

point G: ((Z)-1-chloro-2,3,3-trifluoroprop-1-ene/methanol/trans-dichloroethylene=about 27.4 wt. %/about 8.9 wt. %/about 63.7 wt. %); and point H: ((Z)-1-chloro-2,3,3-trifluoroprop-1-ene/methanol/trans-dichloroethylene=about 28.1 wt. %/about 6.5 wt. %/about 65.4 wt. %).

Aspect 24 is the composition of Aspect 22 or Aspect 23, consisting of (Z)-1-chloro-2,3,3-trifluoroprop-1-ene, methanol, and trans-dichloroethylene are within a quadrilateral region having the following points as vertices:

point I: ((Z)-1-chloro-2,3,3-trifluoroprop-1-ene/methanol/trans-dichloroethylene=about 6.7 wt. %/about 9.2 wt. %/about 84.1 wt. %);

point J: ((Z)-1-chloro-2,3,3-trifluoroprop-1-ene/methanol/trans-dichloroethylene=about 6.7 wt. %/about 10.0 wt. %/about 83.3 wt. %);

point K: ((Z)-1-chloro-2,3,3-trifluoroprop-1-ene/methanol/trans-dichloroethylene=about 7.4 wt. %/about 9.9 wt. %/about 82.7 wt. %); and point L: ((Z)-1-chloro-2,3,3-trifluoroprop-1-ene/methanol/trans-dichloroethylene=about 7.5 wt. %/about 9.2 wt. %/about 83.3 wt. %).

Aspect 25 is the composition of any of Aspects 22-24, consisting of the (Z)-1-chloro-2,3,3-trifluoroprop-1-ene, methanol, and trans-dichloroethylene are present in amounts of about 7.02 wt. %, about 9.85 wt. %, and about 83.13 wt. %, respectively.

Aspect 26 is an azeotrope of azeotrope-like composition consisting essentially of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices:

point A: ((Z)-1-chloro-2,3,3-trifluoroprop-1-ene/methanol/trans-dichloroethylene=about 0.9 wt. %/about 8.2 wt. %/about 90.9 wt. %);

point B: ((Z)-1-chloro-2,3,3-trifluoroprop-1-ene/methanol/trans-dichloroethylene=about 0.9 wt. %/about 13.7 wt. %/about 85.4 wt. %);

point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

Aspect 27 is the azeotrope of azeotrope-like composition of Aspect 26, wherein the azeotrope of azeotrope-like composition consists essentially of (Z)-1-chloro-2,3,3-trifluoroprop-1-ene, methanol, and trans-dichloroethylene are within a quadrilateral region having the following points as vertices:

point E: ((Z)-1-chloro-2,3,3-trifluoroprop-1-ene/methanol/trans-dichloroethylene=about 3.9 wt. %/about 8.7 wt. %/about 87.4 wt. %);

point F: ((Z)-1-chloro-2,3,3-trifluoroprop-1-ene/methanol/trans-dichloroethylene=about 3.8 wt. %/about 11.8 wt. %/about 84.4 wt. %);

point G: ((Z)-1-chloro-2,3,3-trifluoroprop-1-ene/methanol/trans-dichloroethylene=about 27.4 wt. %/about 8.9 wt. %/about 63.7 wt. %); and point H: ((Z)-1-chloro-2,3,3-trifluoroprop-1-ene/methanol/trans-dichloroethylene=about 28.1 wt. %/about 6.5 wt. %/about 65.4 wt. %).

Aspect 28 is the azeotrope of azeotrope-like composition of Aspect 26 or Aspect 27, wherein the azeotrope of azeotrope-like composition consists essentially of (Z)-1-chloro-2,3,3-trifluoroprop-1-ene, methanol, and trans-dichloroethylene are within a quadrilateral region having the following points as vertices:

point I: ((Z)-1-chloro-2,3,3-trifluoroprop-1-ene/methanol/trans-dichloroethylene=about 6.7 wt. %/about 9.2 wt. %/about 84.1 wt. %);

point J: ((Z)-1-chloro-2,3,3-trifluoroprop-1-ene/methanol/trans-dichloroethylene=about 6.7 wt. %/about 10.0 wt. %/about 83.3 wt. %);

point K: ((Z)-1-chloro-2,3,3-trifluoroprop-1-ene/methanol/trans-dichloroethylene=about 7.4 wt. %/about 9.9 wt. %/about 82.7 wt. %); and point L: ((Z)-1-chloro-2,3,3-trifluoroprop-1-ene/methanol/trans-dichloroethylene=about 7.5 wt. %/about 9.2 wt. %/about 83.3 wt. %).

Aspect 29 is the azeotrope of azeotrope-like composition of any of Aspects 26-28, wherein the (Z)-1-chloro-2,3,3-trifluoroprop-1-ene, methanol, and trans-dichloroethylene are present in amounts of about 7.02 wt. %, about 9.85 wt. %, and about 83.13 wt. %, respectively.

Aspect 30 is an azeotrope of azeotrope-like composition consisting of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices:

point A: ((Z)-1-chloro-2,3,3-trifluoroprop-1-ene/methanol/trans-dichloroethylene=about 0.9 wt. %/about 8.2 wt. %/about 90.9 wt. %);

point B: ((Z)-1-chloro-2,3,3-trifluoroprop-1-ene/methanol/trans-dichloroethylene=about 0.9 wt. %/about 13.7 wt. %/about 85.4 wt. %);

point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

Aspect 31 is the azeotrope of azeotrope-like composition of Aspect 30, wherein the azeotrope of azeotrope-like composition consists of (Z)-1-chloro-2,3,3-trifluoroprop-1-ene, methanol, and trans-dichloroethylene are within a quadrilateral region having the following points as vertices:

point E: ((Z)-1-chloro-2,3,3-trifluoroprop-1-ene/methanol/trans-dichloroethylene=about 3.9 wt. %/about 8.7 wt. %/about 87.4 wt. %);

point F: ((Z)-1-chloro-2,3,3-trifluoroprop-1-ene/methanol/trans-dichloroethylene=about 3.8 wt. %/about 11.8 wt. %/about 84.4 wt. %);

point G: ((Z)-1-chloro-2,3,3-trifluoroprop-1-ene/methanol/trans-dichloroethylene=about 27.4 wt. %/about 8.9 wt. %/about 63.7 wt. %); and point H: ((Z)-1-chloro-2,3,3-trifluoroprop-1-ene/methanol/trans-dichloroethylene=about 28.1 wt. %/about 6.5 wt. %/about 65.4 wt. %).

Aspect 32 is the azeotrope of azeotrope-like composition of Aspect 30 or Aspect 31, wherein the azeotrope of azeotrope-like composition consists of (Z)-1-chloro-2,3,3-trifluoroprop-1-ene, methanol, and trans-dichloroethylene are within a quadrilateral region having the following points as vertices:

point I: ((Z)-1-chloro-2,3,3-trifluoroprop-1-ene/methanol/trans-dichloroethylene=about 6.7 wt. %/about 9.2 wt. %/about 84.1 wt. %);

point J: ((Z)-1-chloro-2,3,3-trifluoroprop-1-ene/methanol/trans-dichloroethylene=about 6.7 wt. %/about 10.0 wt. %/about 83.3 wt. %);

point K: ((Z)-1-chloro-2,3,3-trifluoroprop-1-ene/methanol/trans-dichloroethylene=about 7.4 wt. %/about 9.9 wt. %/about 82.7 wt. %); and point L: ((Z)-1-chloro-2,3,3-trifluoroprop-1-ene/methanol/trans-dichloroethylene=about 7.5 wt. %/about 9.2 wt. %/about 83.3 wt. %).

Aspect 33 is the azeotrope of azeotrope-like composition of any of Aspects 30-32, wherein the azeotrope of azeotrope-like composition consists of (Z)-1-chloro-2,3,3-trifluoroprop-1-ene, methanol, and trans-dichloroethylene in amounts of about 7.02 wt. %, about 9.85 wt. %, and about 83.13 wt. %, respectively.

Aspect 34 is the azeotrope of azeotrope-like composition of any of Aspects 26-33, wherein the azeotrope or azeotrope-like composition has a boiling point of about 41.746° C.±0.001° C. at a pressure of about 14.7 psia±0.2 psia.

Aspect 35 is a composition consisting essentially of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices:

point M: ((Z)-1-chloro-2,3,3-trifluoroprop-1-ene/ethanol/trans-dichloroethylene=about 1.0 wt. %/about 1.0 wt. %/about 98.0 wt. %);

point N: ((Z)-1-chloro-2,3,3-trifluoroprop-1-ene/ethanol/trans-dichloroethylene=about 0.9 wt. %/about 9.0 wt. %/about 90.1 wt. %);

point 0: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.5 wt. %/about 0.6 wt. %/about 64.1 wt. %).

Aspect 36 is the composition of Aspect 35, wherein the composition consists essentially of (Z)-1-chloro-2,3,3-trifluoroprop-1-ene, ethanol, and trans-dichloroethylene are within a quadrilateral region having the following points as vertices:

point Q: ((Z)-1-chloro-2,3,3-trifluoroprop-1-ene/ethanol/trans-dichloroethylene=about 13.4 wt. %/about 2.5 wt. %/about 84.1 wt. %);

point R: ((Z)-1-chloro-2,3,3-trifluoroprop-1-ene/ethanol/trans-dichloroethylene=about 12.9 wt. %/about 6.5 wt. %/about 80.6 wt. %);

point S: ((Z)-1-chloro-2,3,3-trifluoroprop-1-ene/ethanol/trans-dichloroethylene=about 31.6 wt. %/about 5.1 wt. %/about 63.3 wt. %); and point T: ((Z)-1-chloro-2,3,3-trifluoroprop-1-ene/ethanol/trans-dichloroethylene=about 32.7 wt. %/about 2.0 wt. %/about 65.3 wt. %).

Aspect 37 is the composition of Aspect 35 or Aspect 36, wherein the composition consists essentially of (Z)-1-chloro-2,3,3-trifluoroprop-1-ene, ethanol, and trans-dichloroethylene are within a quadrilateral region having the following points as vertices:

point U: ((Z)-1-chloro-2,3,3-trifluoroprop-1-ene/ethanol/trans-dichloroethylene=about 22.2 wt. %/about 3.7 wt. %/about 74.1 wt. %);

point V: ((Z)-1-chloro-2,3,3-trifluoroprop-1-ene/ethanol/trans-dichloroethylene=about 22.1 wt. %/about 4.4 wt. %/about 73.5 wt. %);

point W: ((Z)-1-chloro-2,3,3-trifluoroprop-1-ene/ethanol/trans-dichloroethylene=about 27.4 wt. %/about 4.1 wt. %/about 68.5 wt. %); and point X: ((Z)-1-chloro-2,3,3-trifluoroprop-1-ene/ethanol/trans-dichloroethylene=about 27.6 wt. %/about 3.4 wt. %/about 69.0 wt. %).

Aspect 38 is the composition of any of Aspects 35-37, wherein the composition consists essentially of (Z)-1-chloro-2,3,3-trifluoroprop-1-ene, ethanol, and trans-dichloroethylene are present in amounts of about 25.04 wt. %, about 4.11 wt. %, and about 70.85 wt. %, respectively.

Aspect 39 is a composition consisting of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices:

point M: ((Z)-1-chloro-2,3,3-trifluoroprop-1-ene/ethanol/trans-dichloroethylene=about 1.0 wt. %/about 1.0 wt. %/about 98.0 wt. %);

point N: ((Z)-1-chloro-2,3,3-trifluoroprop-1-ene/ethanol/trans-dichloroethylene=about 0.9 wt. %/about 9.0 wt. %/about 90.1 wt. %);

point 0: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.5 wt. %/about 0.6 wt. %/about 64.1 wt. %).

Aspect 40 is the composition of Aspect 39, wherein the composition consists of (Z)-1-chloro-2,3,3-trifluoroprop-1-ene, ethanol, and trans-dichloroethylene are within a quadrilateral region having the following points as vertices:

point Q: ((Z)-1-chloro-2,3,3-trifluoroprop-1-ene/ethanol/trans-dichloroethylene=about 13.4 wt. %/about 2.5 wt. %/about 84.1 wt. %);

point R: ((Z)-1-chloro-2,3,3-trifluoroprop-1-ene/ethanol/trans-dichloroethylene=about 12.9 wt. %/about 6.5 wt. %/about 80.6 wt. %);

point S: ((Z)-1-chloro-2,3,3-trifluoroprop-1-ene/ethanol/trans-dichloroethylene=about 31.6 wt. %/about 5.1 wt. %/about 63.3 wt. %); and point T: ((Z)-1-chloro-2,3,3-trifluoroprop-1-ene/ethanol/trans-dichloroethylene=about 32.7 wt. %/about 2.0 wt. %/about 65.3 wt. %).

Aspect 41 is the composition of Aspect 39 or Aspect 40, wherein the composition consists of (Z)-1-chloro-2,3,3-trifluoroprop-1-ene, ethanol, and trans-dichloroethylene are within a quadrilateral region having the following points as vertices:

point U: ((Z)-1-chloro-2,3,3-trifluoroprop-1-ene/ethanol/trans-dichloroethylene=about 22.2 wt. %/about 3.7 wt. %/about 74.1 wt. %);

point V: ((Z)-1-chloro-2,3,3-trifluoroprop-1-ene/ethanol/trans-dichloroethylene=about 22.1 wt. %/about 4.4 wt. %/about 73.5 wt. %);

point W: ((Z)-1-chloro-2,3,3-trifluoroprop-1-ene/ethanol/trans-dichloroethylene=about 27.4 wt. %/about 4.1 wt. %/about 68.5 wt. %); and point X: ((Z)-1-chloro-2,3,3-trifluoroprop-1-ene/ethanol/trans-dichloroethylene=about 27.6 wt. %/about 3.4 wt. %/about 69.0 wt. %).

Aspect 42 is the composition of any of Aspects 39-41, wherein the composition consists of (Z)-1-chloro-2,3,3-trifluoroprop-1-ene, ethanol, and trans-dichloroethylene are present in amounts of about 25.04 wt. %, about 4.11 wt. %, and about 70.85 wt. %, respectively.

Aspect 43 is an azeotrope or azeotrope-like composition consisting essentially of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices:

point M: ((Z)-1-chloro-2,3,3-trifluoroprop-1-ene/ethanol/trans-dichloroethylene=about 1.0 wt. %/about 1.0 wt. %/about 98.0 wt. %);

point N: ((Z)-1-chloro-2,3,3-trifluoroprop-1-ene/ethanol/trans-dichloroethylene=about 0.9 wt. %/about 9.0 wt. %/about 90.1 wt. %);

point 0: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.5 wt. %/about 0.6 wt. %/about 64.1 wt. %).

Aspect 44 is the composition of Aspect 43, wherein the composition is an azeotrope or azeotrope-like composition consisting essentially of (Z)-1-chloro-2,3,3-trifluoroprop-1-ene, ethanol, and trans-dichloroethylene are within a quadrilateral region having the following points as vertices:

point Q: ((Z)-1-chloro-2,3,3-trifluoroprop-1-ene/ethanol/trans-dichloroethylene=about 13.4 wt. %/about 2.5 wt. %/about 84.1 wt. %);

point R: ((Z)-1-chloro-2,3,3-trifluoroprop-1-ene/ethanol/trans-dichloroethylene=about 12.9 wt. %/about 6.5 wt. %/about 80.6 wt. %);

point S: ((Z)-1-chloro-2,3,3-trifluoroprop-1-ene/ethanol/trans-dichloroethylene=about 31.6 wt. %/about 5.1 wt. %/about 63.3 wt. %); and point T: ((Z)-1-chloro-2,3,3-trifluoroprop-1-ene/ethanol/trans-dichloroethylene=about 32.7 wt. %/about 2.0 wt. %/about 65.3 wt. %).

Aspect 45 is the composition of Aspect 43 or Aspect 44, wherein the composition is an azeotrope or azeotrope-like composition consisting essentially of (Z)-1-chloro-2,3,3-trifluoroprop-1-ene, ethanol, and trans-dichloroethylene are within a quadrilateral region having the following points as vertices:

point U: ((Z)-1-chloro-2,3,3-trifluoroprop-1-ene/ethanol/trans-dichloroethylene=about 22.2 wt. %/about 3.7 wt. %/about 74.1 wt. %);

point V: ((Z)-1-chloro-2,3,3-trifluoroprop-1-ene/ethanol/trans-dichloroethylene=about 22.1 wt. %/about 4.4 wt. %/about 73.5 wt. %);

point W: ((Z)-1-chloro-2,3,3-trifluoroprop-1-ene/ethanol/trans-dichloroethylene=about 27.4 wt. %/about 4.1 wt. %/about 68.5 wt. %); and point X: ((Z)-1-chloro-2,3,3-trifluoroprop-1-ene/ethanol/trans-dichloroethylene=about 27.6 wt. %/about 3.4 wt. %/about 69.0 wt. %).

Aspect 46 is the composition of any of Aspects 43-45, wherein the composition is an azeotrope or azeotrope-like composition consists essentially of (Z)-1-chloro-2,3,3-trifluoroprop-1-ene, ethanol, and trans-dichloroethylene are present in amounts of about 25.04 wt. %, about 4.11 wt. %, and about 70.85 wt. %, respectively.

Aspect 47 is an azeotrope or azeotrope-like composition consisting of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices:

point M: ((Z)-1-chloro-2,3,3-trifluoroprop-1-ene/ethanol/trans-dichloroethylene=about 1.0 wt. %/about 1.0 wt. %/about 98.0 wt. %);

point N: ((Z)-1-chloro-2,3,3-trifluoroprop-1-ene/ethanol/trans-dichloroethylene=about 0.9 wt. %/about 9.0 wt. %/about 90.1 wt. %);

point 0: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.5 wt. %/about 0.6 wt. %/about 64.1 wt. %).

Aspect 48 is the composition of Aspect 47, wherein the composition is an azeotrope or azeotrope-like composition consisting of (Z)-1-chloro-2,3,3-trifluoroprop-1-ene, ethanol, and trans-dichloroethylene are within a quadrilateral region having the following points as vertices:

point Q: ((Z)-1-chloro-2,3,3-trifluoroprop-1-ene/ethanol/trans-dichloroethylene=about 13.4 wt. %/about 2.5 wt. %/about 84.1 wt. %);

point R: ((Z)-1-chloro-2,3,3-trifluoroprop-1-ene/ethanol/trans-dichloroethylene=about 12.9 wt. %/about 6.5 wt. %/about 80.6 wt. %);

point S: ((Z)-1-chloro-2,3,3-trifluoroprop-1-ene/ethanol/trans-dichloroethylene=about 31.6 wt. %/about 5.1 wt. %/about 63.3 wt. %); and point T: ((Z)-1-chloro-2,3,3-trifluoroprop-1-ene/ethanol/trans-dichloroethylene=about 32.7 wt. %/about 2.0 wt. %/about 65.3 wt. %).

Aspect 49 is the composition of Aspect 47 or Aspect 48, wherein the composition is an azeotrope or azeotrope-like composition consisting of (Z)-1-chloro-2,3,3-trifluoroprop-1-ene, ethanol, and trans-dichloroethylene are within a quadrilateral region having the following points as vertices:

point U: ((Z)-1-chloro-2,3,3-trifluoroprop-1-ene/ethanol/trans-dichloroethylene=about 22.2 wt. %/about 3.7 wt. %/about 74.1 wt. %);

point V: ((Z)-1-chloro-2,3,3-trifluoroprop-1-ene/ethanol/trans-dichloroethylene=about 22.1 wt. %/about 4.4 wt. %/about 73.5 wt. %);

point W: ((Z)-1-chloro-2,3,3-trifluoroprop-1-ene/ethanol/trans-dichloroethylene=about 27.4 wt. %/about 4.1 wt. %/about 68.5 wt. %); and point X: ((Z)-1-chloro-2,3,3-trifluoroprop-1-ene/ethanol/trans-dichloroethylene=about 27.6 wt. %/about 3.4 wt. %/about 69.0 wt. %).

Aspect 50 is the composition of any of Aspects 47-49, wherein the composition consists of (Z)-1-chloro-2,3,3-trifluoroprop-1-ene, ethanol, and trans-dichloroethylene are present in amounts of about 25.04 wt. %, about 4.11 wt. %, and about 70.85 wt. %, respectively.

Aspect 51 is the composition of any of Aspects 43-50, wherein the azeotrope or azeotrope-like composition has a boiling point of about 41.746° C.±0.001° C. at a pressure of about 14.7 psia±0.2 psia.

Aspect 52 is a solvent composition comprising any of the compositions of Aspects 1 to 51.

Aspect 53 is the use as a solvent of a composition of any one of Aspects 1 to 52.

Aspect 54 is a method for cleaning a substrate, comprising contacting the substrate with the composition of any of Aspects 1 to 52.

Aspect 55 is the method of Aspect 54, wherein contacting the substrate comprises contacting the composition with oil, grease, dirt, mineral oils, silicon oils, fluorosilicon oils, fingerprints, or lubricants.

Aspect 56 is the method of Aspect 54, wherein contacting the substrate comprises contacting the composition with solder flux.

Aspect 57 is a method for vapor degreasing, comprising:

vaporizing the composition of any one of Aspects 1 to 52; and contacting the vaporized solvent composition with a surface including oil, grease, dirt, mineral oils, silicon oils, or lubricants.

Aspect 58 is a method for cleaning, comprising:

dispensing from a container in aerosol form, the composition of Aspects 1 to 52 onto a surface.

Aspect 59 is a method for liquid solvating, comprising:

contacting the composition of any one of Aspects 1 to 52 with a surface including paint, coatings, or adhesives.

Aspect 60 is a composition comprising any of Aspects 1-52.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the appended claims.

The invention claimed is:

1. An azeotrope or azeotrope-like composition consisting essentially of from about 88 wt. % to about 94 wt. % (Z)-1-chloro-2,3,3-trifluoroprop-1-ene and from about 6 wt. % to about 12 wt. % methanol.

2. The composition of claim 1, wherein the azeotrope or azeotrope-like composition consists essentially of from about 90 wt. % to 92.2 wt. % (Z)-1-chloro-2,3,3-trifluoroprop-1-ene and from about 7.8 wt. % to about 10 wt. % methanol.

3. The composition of claim 1, wherein the azeotrope or azeotrope-like composition has a boiling point of about 49.66° C.±0.01° C. at a pressure of about 14.7 psia±0.2 psia.

4. The composition of claim 1, wherein the composition is a solvent composition.

5. An azeotrope or azeotrope-like composition consisting essentially of (Z)-1-chloro-2,3,3-trifluoroprop-1-ene, methanol, and trans-dichloroethylene wherein in a ternary composition diagram the (Z)-1-chloro-2,3,3-trifluoroprop-1-ene, methanol, and trans-dichloroethylene are within a quadrilateral region having the following points as vertices:

point A: ((Z)-1-chloro-2,3,3-trifluoroprop-1-ene/methanol/trans-dichloroethylene=about 0.9 wt. %/about 8.2 wt. %/about 90.9 wt. %);

point B: ((Z)-1-chloro-2,3,3-trifluoroprop-1-ene/methanol/trans-dichloroethylene=about 0.9 wt. %/about 13.7 wt. %/about 85.4 wt. %);

point C: ((Z)-1-chloro-2,3,3-trifluoroprop-1-ene/methanol/trans-dichloroethylene=about 39.6 wt. %/about 8.3 wt. %/about 52.1 wt. %); and point D: ((Z)-1-chloro-2,3,3-trifluoroprop-1-ene/methanol/trans-dichloroethylene=about 41.1 wt. %/about 4.9 wt. %/about 54.0 wt. %).

6. The composition of claim 5, wherein the (Z)-1-chloro-2,3,3-trifluoroprop-1-ene, methanol, and trans-dichloroethylene are within a quadrilateral region having the following points as vertices:

point E: ((Z)-1-chloro-2,3,3-trifluoroprop-1-ene/methanol/trans-dichloroethylene=about 3.9 wt. %/about 8.7 wt. %/about 87.4 wt. %);

point F: ((Z)-1-chloro-2,3,3-trifluoroprop-1-ene/methanol/trans-dichloroethylene=about 3.8 wt. %/about 11.8 wt. %/about 84.4 wt. %);

point G: ((Z)-1-chloro-2,3,3-trifluoroprop-1-ene/methanol/trans-dichloroethylene=about 27.4 wt. %/about 8.9 wt. %/about 63.7 wt. %); and point H: ((Z)-1-chloro-2,3,3-trifluoroprop-1-ene/methanol/trans-dichloroethylene=about 28.1 wt. %/about 6.5 wt. %/about 65.4 wt. %).

7. The composition of claim 5, wherein the (Z)-1-chloro-2,3,3-trifluoroprop-1-ene, methanol, and trans-dichloroethylene are within a quadrilateral region having the following points as vertices:

point I: ((Z)-1-chloro-2,3,3-trifluoroprop-1-ene/methanol/trans-dichloroethylene=about 6.7 wt. %/about 9.2 wt. %/about 84.1 wt. %);

point J: ((Z)-1-chloro-2,3,3-trifluoroprop-1-ene/methanol/trans-dichloroethylene=about 6.7 wt. %/about 10.0 wt. %/about 83.3 wt. %);

point K: ((Z)-1-chloro-2,3,3-trifluoroprop-1-ene/methanol/trans-dichloroethylene=about 7.4 wt. %/about 9.9 wt. %/about 82.7 wt. %); and point L: ((Z)-1-chloro-2,3,3-trifluoroprop-1-ene/methanol/trans-dichloroethylene=about 7.5 wt. %/about 9.2 wt. %/about 83.3 wt. %).

8. The composition of claim 5, wherein the azeotrope or azeotrope-like composition has a boiling point of about 41.746° C.±0.001° C. at a pressure of about 14.7 psia±0.2 psia.

9. The composition of claim 5, wherein the composition is a solvent composition.

10. An azeotrope or azeotrope-like composition consisting essentially of (Z)-1-chloro-2,3,3-trifluoroprop-1-ene, ethanol, and trans-dichloroethylene wherein in a ternary composition diagram the (Z)-1-chloro-2,3,3-trifluoroprop-1-ene, ethanol, and trans-dichloroethylene are within a quadrilateral region having the following points as vertices:

point M: ((Z)-1-chloro-2,3,3-trifluoroprop-1-ene/ethanol/trans-dichloroethylene=about 1.0 wt. %/about 1.0 wt. %/about 98.0 wt. %);

point N: ((Z)-1-chloro-2,3,3-trifluoroprop-1-ene/ethanol/trans-dichloroethylene=about 0.9 wt. %/about 9.0 wt. %/about 90.1 wt. %);

point O: ((Z)-1-chloro-2,3,3-trifluoroprop-1-ene/ethanol/trans-dichloroethylene=about 33.3 wt. %/about 6.1 wt. %/about 60.6 wt. %); and point P: ((Z)-1-chloro-2,3,3-trifluoroprop-1-ene/ethanol/trans-dichloroethylene=about 35.3 wt. %/about 0.6 wt. %/about 64.1 wt. %).

11. The composition of claim 10, wherein the (Z)-1-chloro-2,3,3-trifluoroprop-1-ene, ethanol, and trans-dichloroethylene are within a quadrilateral region having the following points as vertices:

point Q: ((Z)-1-chloro-2,3,3-trifluoroprop-1-ene/ethanol/trans-dichloroethylene=about 13.4 wt. %/about 2.5 wt. %/about 84.1 wt. %);

point R: ((Z)-1-chloro-2,3,3-trifluoroprop-1-ene/ethanol/trans-dichloroethylene=about 12.9 wt. %/about 6.5 wt. %/about 80.6 wt. %);

point S: ((Z)-1-chloro-2,3,3-trifluoroprop-1-ene/ethanol/trans-dichloroethylene=about 31.6 wt. %/about 5.1 wt. %/about 63.3 wt. %); and point T: ((Z)-1-chloro-2,3,3-trifluoroprop-1-ene/ethanol/trans-dichloroethylene=about 32.7 wt. %/about 2.0 wt. %/about 65.3 wt. %).

12. The composition of claim 10, wherein the (Z)-1-chloro-2,3,3-trifluoroprop-1-ene, ethanol, and trans-dichloroethylene are within a quadrilateral region having the following points as vertices:

point U: ((Z)-1-chloro-2,3,3-trifluoroprop-1-ene/ethanol/trans-dichloroethylene=about 22.2 wt. %/about 3.7 wt. %/about 74.1 wt. %);

point V: ((Z)-1-chloro-2,3,3-trifluoroprop-1-ene/ethanol/trans-dichloroethylene=about 22.1 wt. %/about 4.4 wt. %/about 73.5 wt. %);

point W: ((Z)-1-chloro-2,3,3-trifluoroprop-1-ene/ethanol/trans-dichloroethylene=about 27.4 wt. %/about 4.1 wt. %/about 68.5 wt. %); and point X: ((Z)-1-chloro-2,3,3-trifluoroprop-1-ene/ethanol/trans-dichloroethylene=about 27.6 wt. %/about 3.4 wt. %/about 69.0 wt. %).

13. The composition of claim 10, wherein the azeotrope or azeotrope-like composition has a boiling point of about 41.746° C.±0.001° C. at a pressure of about 14.7 psia±0.2 psia.

14. The composition of claim 10, wherein the composition is a solvent composition.

15. The composition of claim 4, further comprising at least one co-solvent.

16. The composition of claim 9, further comprising at least one co-solvent.

17. The composition of claim 14, further comprising at least one co-solvent.

* * * * *